United States Patent
Barajas-Olalde et al.

(10) Patent No.: US 11,448,792 B2
(45) Date of Patent: Sep. 20, 2022

(54) LOCATING UNDERGROUND FEATURES WITH SEISMIC DATA PROCESSING

(71) Applicant: Energy and Environmental Research Center Foundation, Grand Forks, ND (US)

(72) Inventors: César Barajas-Olalde, Tampico (MX); Kyle A. Glazewski, Grand Forks, ND (US); Nicholas W. Bosshart, Larimore, ND (US)

(73) Assignee: Energy and Environmental Research Center Foundation, Grand Forks, ND (US)

( * ) Notice: Subject to any disclaimer, the term of this patent is extended or adjusted under 35 U.S.C. 154(b) by 126 days.

(21) Appl. No.: 17/116,409

(22) Filed: Dec. 9, 2020

(65) Prior Publication Data

US 2021/0215843 A1    Jul. 15, 2021

Related U.S. Application Data

(60) Provisional application No. 62/961,472, filed on Jan. 15, 2020.

(51) Int. Cl.
| | |
|---|---|
| *G01V 1/36* | (2006.01) |
| *G01V 1/30* | (2006.01) |
| *G01V 1/28* | (2006.01) |
| *G06N 5/04* | (2006.01) |
| *G06N 20/00* | (2019.01) |

(52) U.S. Cl.
CPC .............. *G01V 1/364* (2013.01); *G01V 1/288* (2013.01); *G01V 1/301* (2013.01); *G06N 5/04* (2013.01); *G06N 20/00* (2019.01); *G01V 2210/3246* (2013.01); *G01V 2210/3248* (2013.01)

(58) Field of Classification Search
CPC ........ G01V 1/364; G01V 1/288; G01V 1/301; G01V 2210/3246; G01V 2210/3248; G06N 5/04; G06N 20/00
See application file for complete search history.

(56) References Cited

U.S. PATENT DOCUMENTS

2007/0265786 A1*  11/2007  Ozdemir ................ G01V 1/201
                                                   702/17

* cited by examiner

*Primary Examiner* — Manuel A Rivera Vargas
(74) *Attorney, Agent, or Firm* — Schwegman Lundberg & Woessner, P.A.

(57) ABSTRACT

Methods are presented for determining the location of underground features (e.g., $CO_2$). One method includes capturing, by sensors distributed throughout a region, seismic traces associated with seismic signals generated by a seismic source. For multiple sensors, active noise is identified or passive noise is measured within each seismic trace and values for attributes associated with the active or passive noise are determined. Further, an unsupervised machine-learning model, based on the values of the attributes, is utilized to determine noise characteristics for multiple sensors. The sensors are grouped in clusters based on the noise characteristics for each sensor. For multiple clusters, a noise filter is created based on the noise characteristics of the sensors in the cluster, and the noise filter of the cluster is applied, for multiple sensors, to the seismic traces of the sensor. Additionally, the filtered seismic traces are analyzed to determine a location of $CO_2$ underground.

21 Claims, 18 Drawing Sheets

$CO_2$ DETECTION USING SEISMIC REFLECTIONS

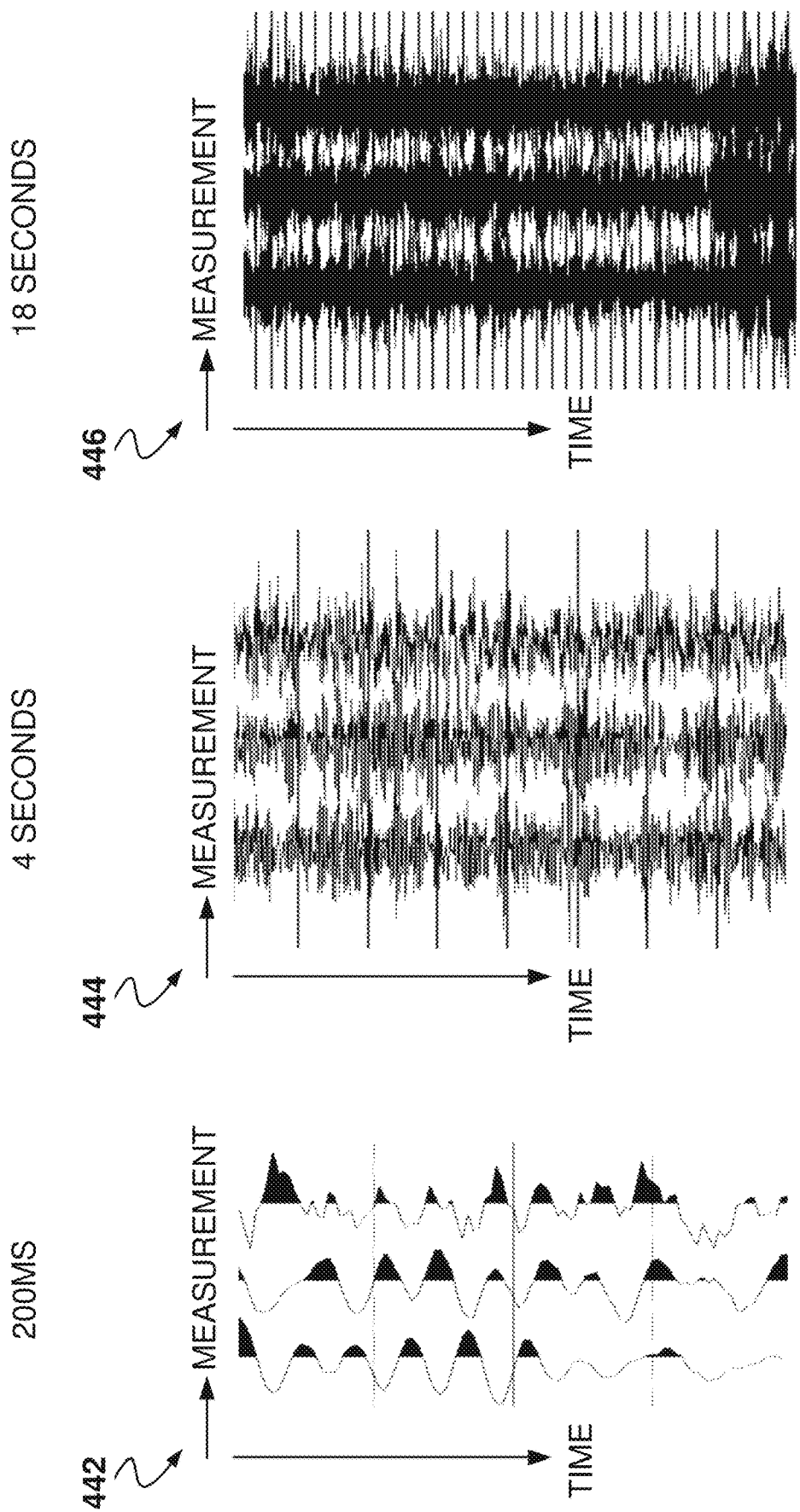

LOCATING UNDERGROUND FEATURES WITH SEISMIC DATA PROCESSING

CLAIM OF PRIORITY

This application claims priority from U.S. Provisional Patent Application No. 62/961,472, filed Jan. 15, 2020, and entitled "Locating Underground Features with Seismic Data Processing." This provisional application is herein incorporated by reference in its entirety.

STATEMENT REGARDING FEDERALLY SPONSORED RESEARCH OR DEVELOPMENT

This invention was made with government support under Department of Energy Cooperative Agreement DE-FE0024233; Subtask 1.4; UND Fund/Project 41000/22671; EERC Fund 22671, awarded by the Department of Energy. The government has certain rights in the invention.

TECHNICAL FIELD

The subject matter disclosed herein generally relates to methods, systems, and machine-readable storage media for seismic data processing and, more particularly, methods, systems, and machine-readable storage media for processing seismic data to locate underground features.

BACKGROUND

Carbon Dioxide Enhanced Oil Recovery ($CO_2$ EOR) is an important component of U.S. oil production, accounting for nearly 6% of U.S. onshore oil production, or 350,000 barrels a day. This technique uses $CO_2$ to increase the production of oil from existing oil fields. After primary and secondary (water flooding) phases of production, 65% or more of the original oil in place may remain in the rock. EOR processes change the physical characteristics of the oil to enable greater production.

Government institutions and oil producers want to assess the viability of $CO_2$ EOR, which includes quantifying prospective $CO_2$ storage resource in residual oil zones (ROZs) and developing methods for monitoring geologic $CO_2$ storage.

A technique called Scalable, Automated, Semipermanent, Seismic Array (SASSA) is a seismic method for detecting and tracking injected $CO_2$ plume miscible fronts as they traverse discreet points within a reservoir. SASSA provides a way to continuously monitor the $CO_2$ plume edges in the reservoir and to detect $CO_2$ migration out of the reservoir.

SASSA utilizes a permanent seismic source and a plurality of seismic sensors distributed over an area to detect $CO_2$ under the surface. However, noise conditions in the area interfere with the seismic signals, which reduces the efficiency of the SASSA method.

Methods to reduce the interference of noise in the measurements of seismic data will enable the improved monitoring of $CO_2$ under the surface. Also, by reducing noise, fewer sensors may be required to monitor $CO_2$ in the region.

BRIEF DESCRIPTION OF THE DRAWINGS

Various ones of the appended drawings merely illustrate example embodiments of the present disclosure and cannot be considered as limiting its scope.

FIGS. 4E-4G show some sample measurements of three component passive noise at sensor 1.

DETAILED DESCRIPTION

Figure 1:
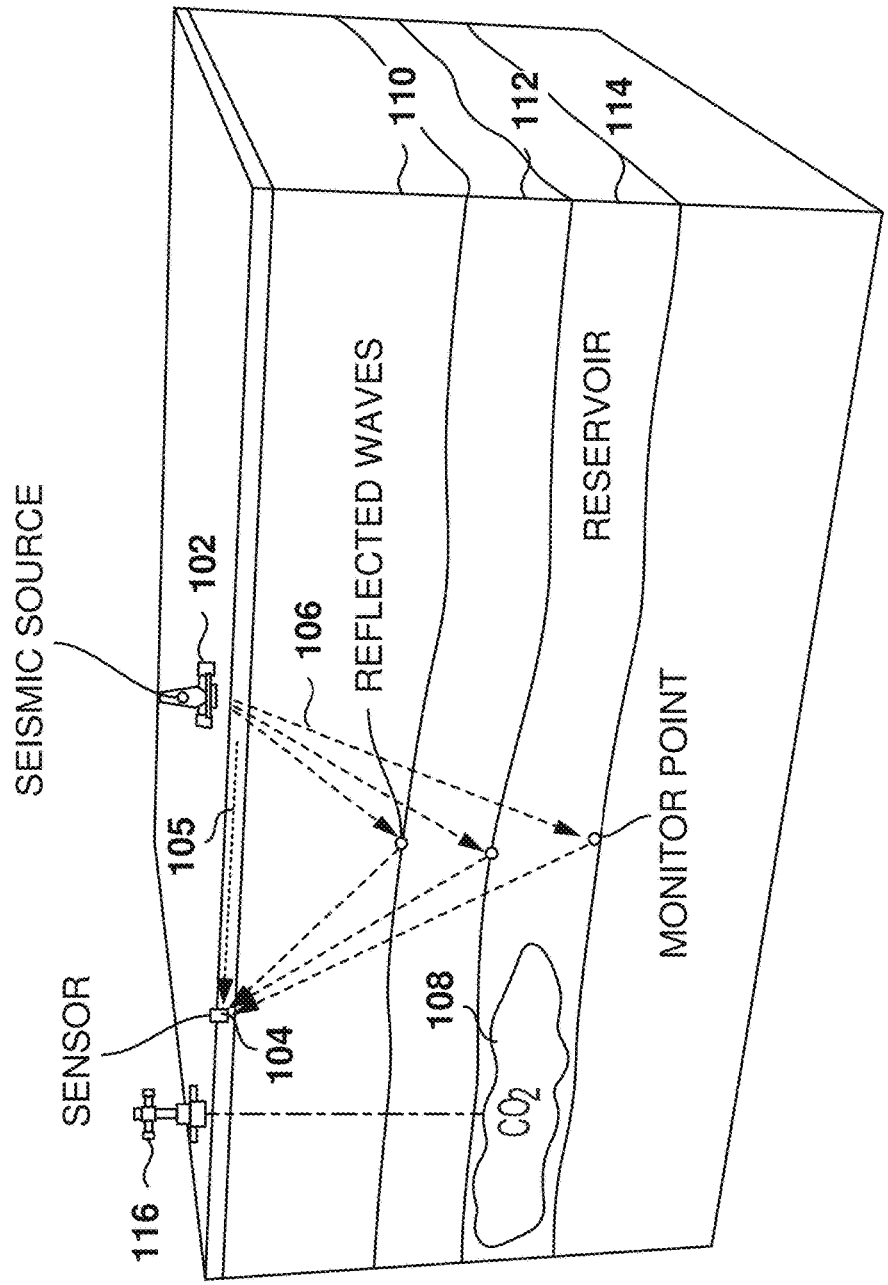
FIG. 1 illustrates a process to detect $CO_2$ using seismic reflections, according to some example embodiments.

Example methods, systems, and computer programs are directed to determining the location of underground features (e.g., $CO_2$). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Overview

It is well known that the heterogeneities of the near-surface strata affect the amplitude and phase of land seismic data. Therefore, it is common to observe spatial variations of signal-to-noise ratio in pre-stack seismic data that require compensation for the successful application of amplitude variation with offset or angle, inversion, and time-lapse techniques. Surface-consistent corrections are commonly applied to attenuate the spatial variations of the seismic signals. Since these corrections are highly sensitive to noise in the study area, signal-to-noise ratio values are estimated to attenuate the effect of noise. However, current methods do not explicitly take into account the spatial variability of noise in the pre-stack seismic data.

In one aspect, methods are presented to automate mapping and identification of spatial variations of the seismic signal and noise due to near-surface heterogeneity in onshore surveys. In one example embodiment, a method is based on machine-learning algorithms which integrate attributes derived from pre-stack seismic data, noise records, and ancillary information such as satellite images and well logs. This information can be used to improve the noise attenuation, surface consistent amplitude and deconvolution steps of seismic data processing. The machine-learning algorithms are utilized to cluster the data in groups having similar noise characteristics due to local geology and cultural effects such as pipelines, electrical equipment at wells, stationary motors, and others.

In some example embodiments, unsupervised machine-learning algorithms and a dedicated number of attributes are evaluated to estimate the initial clusters. The results may be refined using unsupervised, semi-supervised, or supervised algorithms. The initial number of clusters can be used as a starting point for clustering algorithms such as K-means, hard c-means (HCM) and fuzzy c-means (FCM) to define crisp or fuzzy clusters depending on the knowledge about the study area or the required level of detail in the estimation of the spatial variations of the seismic data.

The methodology can be applied to conventional, regularly (spatially) sampled seismic data and to data sets from irregular and sparsely situated sensors sets. The use of irregularly distributes sensors is more economical and flexible but their use has been hindered due to the lack of effective and proven processing workflows and algorithms. The embodiments presented herein enable the effective deployment of irregular and sparse datasets in commercial environments. Individual sensors are used to correctly estimate the spatial relationship between seismic traces acquired at the sensors.

Although the methodology is presented with reference to $CO_2$ detection, the same principles may be applied to the detection of other underground features, such as oil reservoirs, underground structures, etc.

One general aspect includes a method that includes an operation for capturing, by a plurality of sensors distributed throughout a region, a plurality of seismic traces associated with seismic signals generated by a seismic source. For multiple sensors, noise is identified within seismic traces generated by the sensors and values for attributes associated with the noise are determined. Further, an unsupervised machine-learning model, based on the values of the attributes, is utilized to determine noise characteristics for multiple sensors. The sensors are grouped in a plurality of clusters based on the noise characteristics for each sensor. For multiple clusters, a noise filter is created based on the noise characteristics of the sensors in the cluster, and the noise filter of the cluster is applied, for one or more sensors, to the seismic traces of the sensor. Additionally, the filtered seismic traces are analyzed to determine a location of $CO_2$ underground.

FIG. 1 illustrates a process to detect $CO_2$ using seismic reflections, according to some example embodiments. With SASSA, a seismic source 102 at a fixed location is periodically fired and the seismic signal is captured by a sparse array of autonomous surface receivers, also referred to as sensors 104. The surface array is designed so that a set of reflection points within a reservoir layer 114 are monitored at carefully chosen locations that are expected to encounter the $CO_2$ plume 108 that has been injected into the ground by well 116.

Although the SASSA method is used for describing the present embodiments, the same principles may be applied with other sensing methods.

Reflected waves 106 are generated when the seismic signal finds a contrast in the physical properties of layers underground (e.g., boundaries of layers). In the illustrated example, the waves travel through a near-surface layer 110 and then the signal is reflected at the interface between the near-surface layer 110 and layer 112. Further, the signal also bounces when it reaches the interface between the layer 112 and the reservoir layer 114. The signal may also bounce when the signal reaches the bottom side of the reservoir layer 114. Further, the signal will bounce when it reaches the $CO_2$ plume 108.

The data captured by the sensors 104 is used to monitor the location of the $CO_2$ plume 108 and detect if the $CO_2$ plume 108 moves in the underground.

The sensor 104 detects the signal generated by the seismic source 102 but the signal arrives with noise generally generated in the near-surface strata (e.g., superficial noise 105). This type of noise present underground is referred to as cultural noise. The cultural noise may be caused by many factors present in the environment, such as weather, running water, the ocean, buildings, power plants, people working, etc.

Two types of noise are defined: an active noise and a passive noise. The active noise is noise present around the time that the seismic signal is generated (e.g., within a few seconds before and after). The passive noise is noise present in the underground when the seismic source 102 is not triggering. The time when the active noise is recorded is referred to as the active-noise measurement time, which is in the range from one to 120 seconds (although other intervals may also be used) and covers, at least, the time when the seismic signal from the seismic source 102 bounces back to the sensor 116. To calculate the active noise, the signal is measured during the active-noise measurement time, then a reflected-signal period (or periods) is identified where there is a reflection from the seismic signal. The active noise is then calculated based on the signal measured during the active-noise measurement time and excluding the reflected-signal period.

Figure 2A:
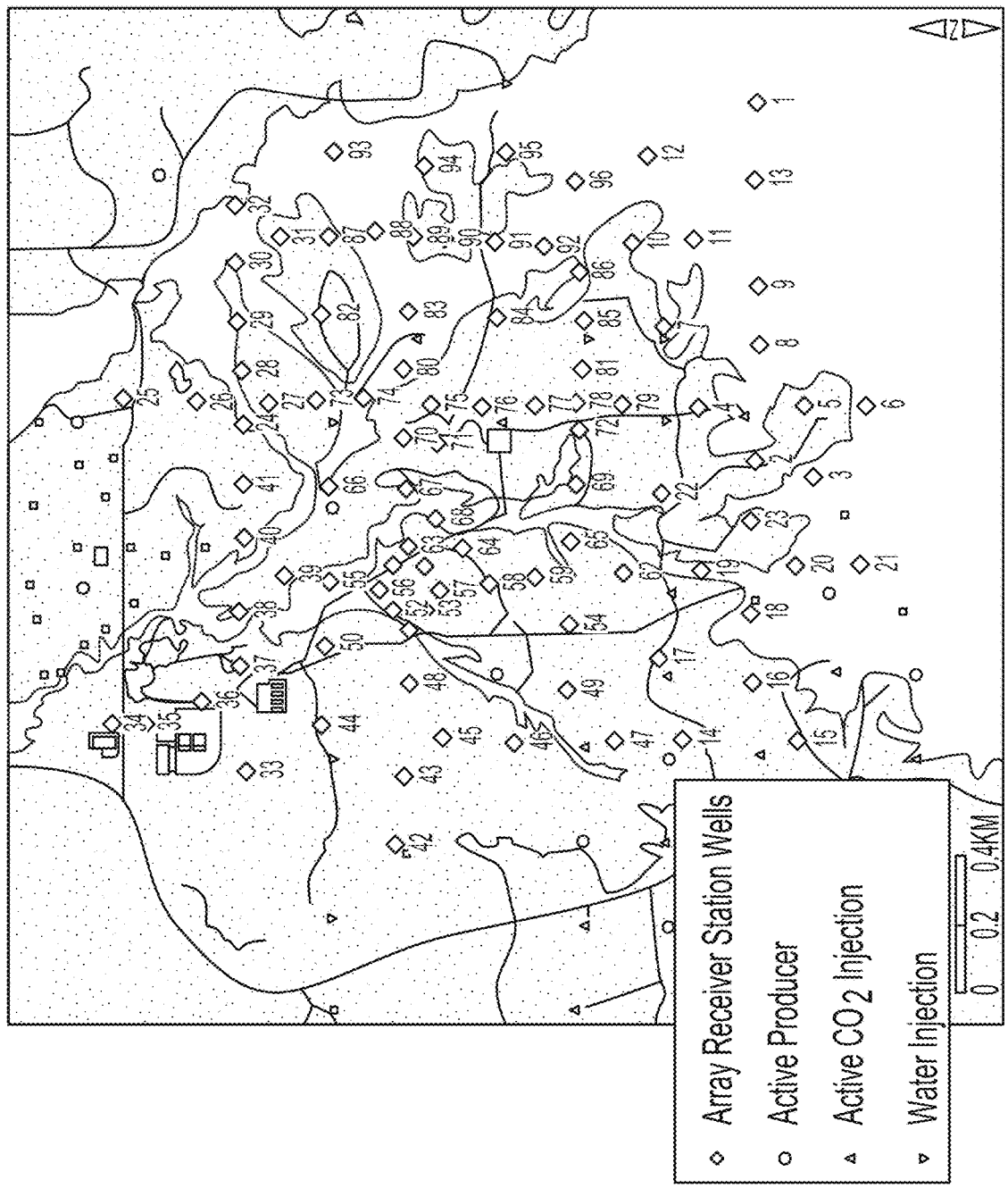
FIG. 2A is a map showing the location of seismic sensors, according to some example embodiments.

FIG. 2A is a map showing the location of seismic sensors, according to some example embodiments. The sensors are identified by a number that is presented next to the sensor. Although FIGS. 2A and B show 96 sensors, the same principles may be used with less sensors or additional sensors. In this example, the seismic source is collocated with sensor 71. In this location, there is a factory near sensor 35, and the factory generates noise that will interfere with the signal.

The sensors are not symmetrically distributed and their spread is sparse compared to other solutions that require close proximity and regular distribution of the sensors. However, the methods described herein may be utilized for any distribution of sensors, regular or irregular.

Determining the noise conditions in this kind of irregular distribution is more difficult than in the case of a regular distribution of sensors as fewer types of gathers can be formed, and a limited number of algorithms can be used to analyze and process the data. Sensor, seismic source, and azimuth gathers can be created with sparse and irregular arrays without extensive data conditioning. Because of the irregularity of the distances between the seismic source and the receivers in the source and azimuth gathers, simple algorithms such as frequency-wave number cannot be applied to characterize or run attenuation noise tests.

Figure 2B:
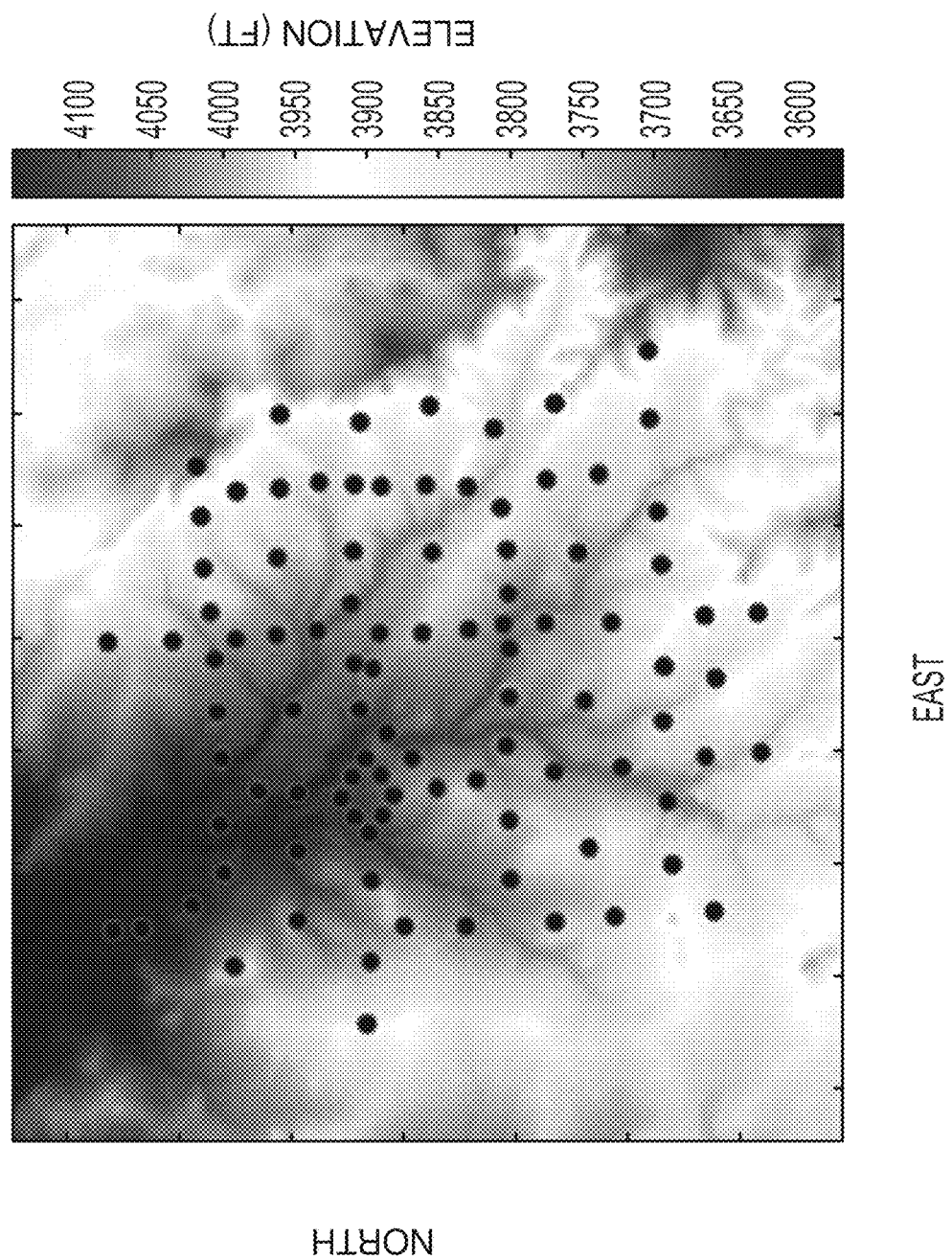
FIG. 2B is an elevation map for the sensor locations, according to some example embodiments.

FIG. 2B is an elevation map for the sensor locations, according to some example embodiments. As shown in the maps, the area is not flat and includes different elevations, from high elevations to low in the valleys. The difference in elevations further complicates the characterization of noise for the different sensors.

In this type of geological scenario, typically, the near-surface layer in the valley is thicker than in the higher elevations. Therefore, the near-surface conditions will be a difference in the valley and the mountainous area, which means a different type of noise is expected.

In conventional seismic acquisition, the distribution of the sensors is very dense, so it is easier to predict and attenuate noise (due to the data redundancy). However, when dealing with larger distances (e.g., 400 meters) and lower sensor density, predicting noise for its optimal attenuation is more complicated (e.g., sparse distribution of sensors at the bottom of the map).

Figure 3:
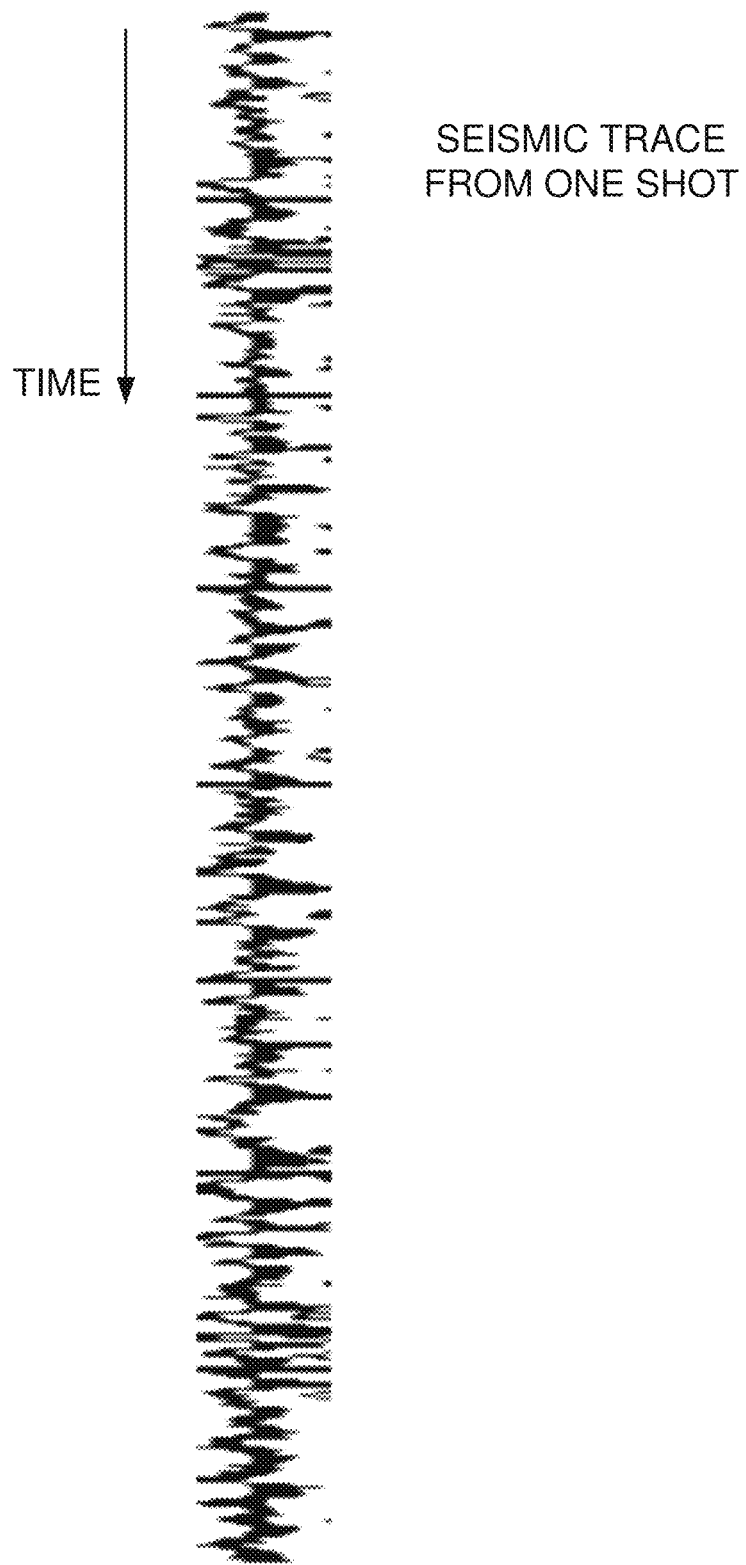
FIG. 3 is a seismic trace received by a sensor and associated with one shot of a seismic source by the seismic sensor, according to some example environments.

FIG. 3 is a seismic trace recorded by the sensor 92, as illustrated in FIG. 2A, associated with one shot by the seismic sensor, according to some example environments. The seismic trace includes the signal bouncing back to the sensor and noise. The seismic trace represents the level of signal and noise received over time, where time evolves on the downward direction. In this example, the seismic trace covers a period of four seconds, but other listening periods may be used depending on the type of application of the seismic method and source used, such as in the range from 1 to hundreds of seconds.

Normally, when seismic acquisition is done, there is a time period between the signal firing and the receipt of the signal bounce. The active noise may be acquired within this period that does not include signal receipt. Also, the signal may bounce at different locations, as illustrated in FIG. 1, so the signal may be received at different times. The windows of time before and between detection of signal bounce can also be used for measuring active noise.

It is difficult to separate signal from noise from just one seismic trace. In some example embodiments, multiple seismic traces are collected for multiple shots of the seismic source. The seismic traces are then combined as illustrated in FIGS. 4A-4D.

In some example embodiments, noise from the first 200 ms of active seismic records from the sensors (or a subset of sensors) is used as a reference of the noise conditions at the recording locations, although other embodiments may utilize different time periods (e.g., from 100 ms to two seconds).

FIGS. 4A-4D are seismograms from multiple shots for different sensors, according to some example embodiments. The seismograms are formed by combining results from multiple shots that are spaced in time, from a few minutes to a week or more. In these examples, 95 shots are included to create each seismogram.

Visual inspection of the seismograms reveals some of the local characteristics of the sensors. For example, FIG. 4C is the seismogram for sensor 92 which shows darker bands where the signal is stronger because the signal arrived at the sensor after bouncing in different places, e.g., to different layer boundaries. The other areas, before, after, and in between the darker bands correspond to active noise. The active noise can be calculated, for example, before the first darker band. As illustrated in FIGS. 2A and 2B, the location of sensor 92 is on a mountainous area.

The signal received is stronger at times 422, 424, and 426 corresponding to bounces on the different layers, with time for 424 corresponding to the bounce on the reservoir layer, which is not very strong because of the noise.

The shots may be spaced to covered months and if the $CO_2$ plume is moving, the signal bounces will show the changes. In this example, the shots were performed weekly.

Figure 4A:
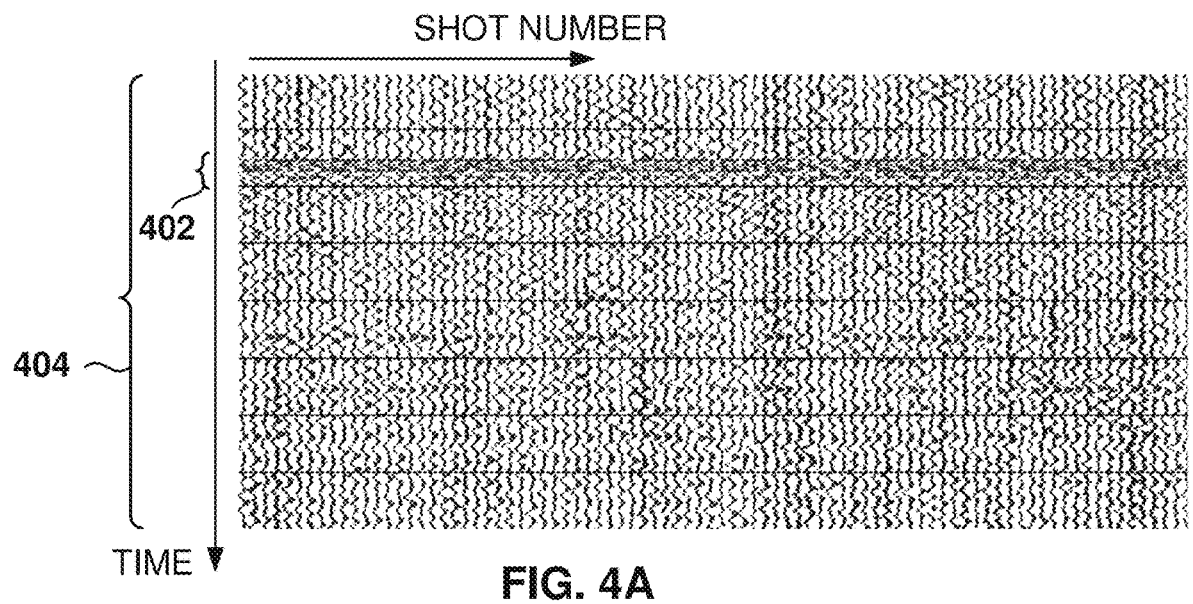
FIGS. 4A-4D are seismograms from multiple shots for different sensors, according to some example embodiments.

FIG. 4A is for sensor 10, which shows a strong signal at reflected-signal period 402. Sensor 10 is at a low elevation and is also further from the seismic source than sensor 92; therefore, the first signal bounce is received later. The active noise is the signal obtained during the active-noise measurement time 404 excluding the signal during the reflected-signal period 402.

Figure 4B:
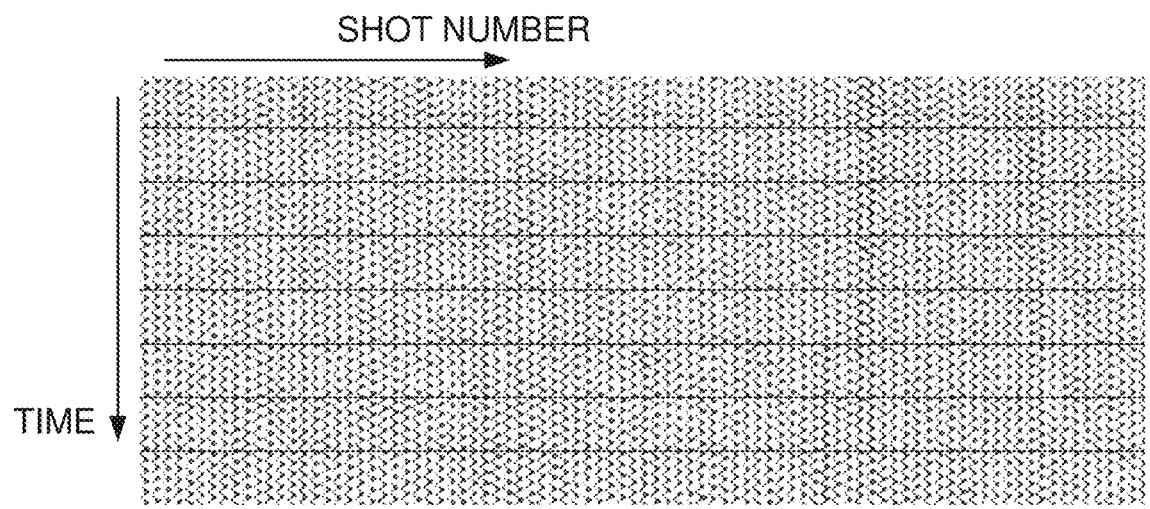
Figure 4C:
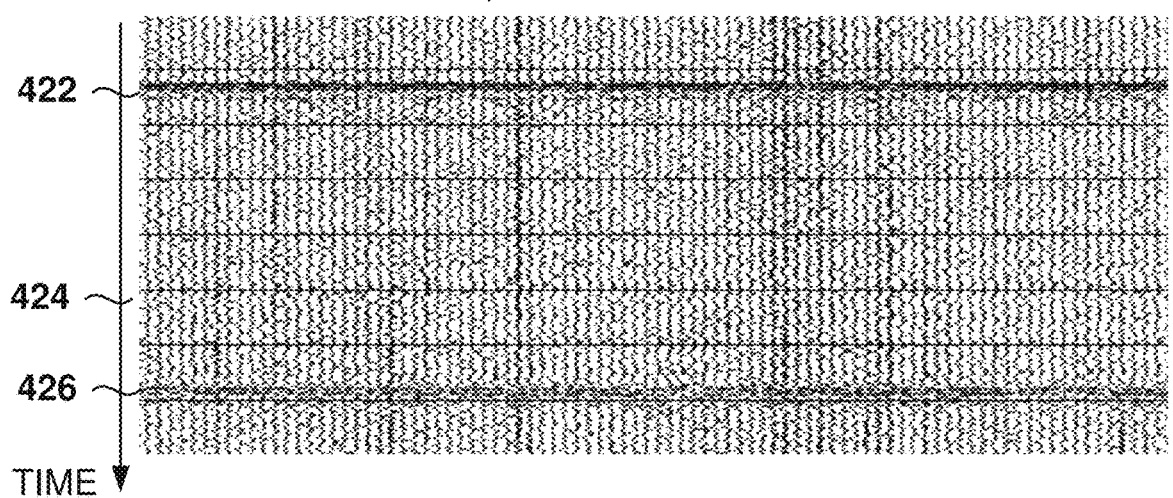

FIG. 4B is for sensor 60, and the seismogram shows that little or no signal is received at this sensor. In this case, sensor 60 is next to a power line, which generates a 60 Hz signal. The noise from the power line overwhelms the seismic signal.

Figure 4D:
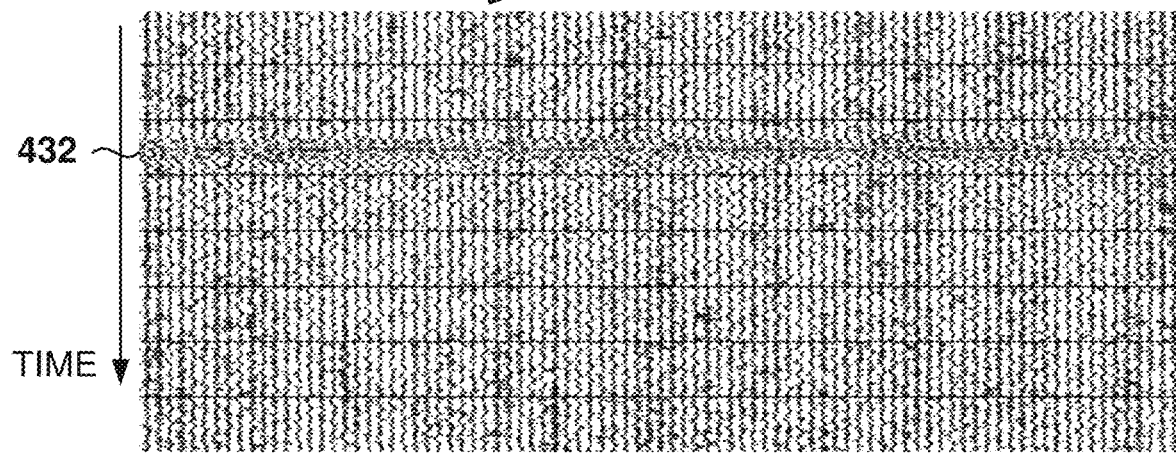

FIG. 4D is for sensor 1, which is at a low elevation and farther from the source than most sensors. Thus, the conditions at sensor 1 are different than at sensor 10, which is at a lower elevation.

The results of comparing the noise records between these sensors, sensors 10, 60, 92, and 1 in FIGS. 4A-4D respectively, summarize the spatial variability of noise to be addressed in a data processing workflow. The seismic records of sensors 1 and 10 show noncoherent noise in the first 200 ms of the records, followed by the first signal arrivals, then by signal and noise until the end of the 4-second records. The seismic records of sensor 60 show coherent noise in all the record length.

In conventional seismic data processing, the same filter is applied to all the sensors, but the filtering of noise is not good because different sensors have different environmental conditions for noise. In some example embodiments, the filtering for noise is tailored to the different sensors. The sensors may be grouped into clusters that have similar noise conditions, and different filters are applied to each of the different clusters.

FIGS. 4E-4G show some sample measurements of three component passive noise at sensor 1. The first two traces represent the horizontal components and the third trace correspond to the vertical component. Passive noise can be used to characterize noise in the study area when active noise is not available. Measurements are taken over different periods of times, from a few milliseconds to a minute or more.

FIG. 4E shows measurements 442 for 200 ms, FIG. 4F shows measurements 444 for 4 seconds, and FIG. 4G shows measurements 446 for 18 seconds. The passive noise may be used to generate the filters for the sensor or for a group of sensors having the same noise characteristics.

Figure 5:
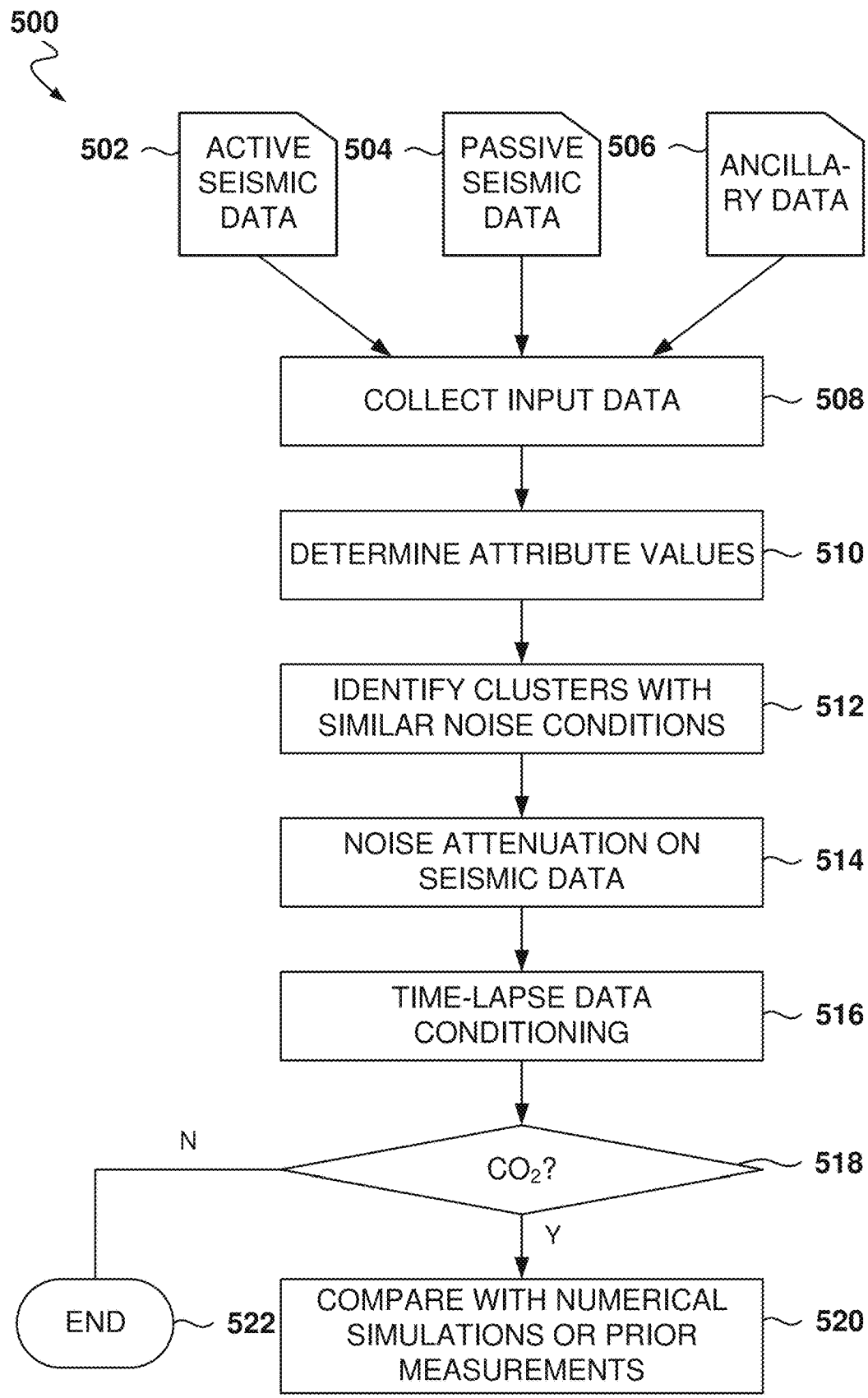
FIG. 5 is a flowchart of a method for identifying the location of $CO_2$ under the surface, according to some example embodiments.

FIG. 5 is a flowchart of a method 500 for identifying the location of $CO_2$ under the surface, according to some example embodiments. At operation 508, the input data is collected for the analysis of the noise. In some example embodiments, the input data includes one or more of active seismic data 502, passive seismic data 504, and other ancillary data 506.

The ancillary data 506 is used to determine the effect of local surface geologic conditions on the noise estimates, and includes a selection from satellite images, well logs, surface geological maps, and other attributes from physical studies.

For example, the density distribution in the near-surface layer, or the locations of the water table affect how the seismic waves propagate.

At operation 510, values for attributes used by the machine-learning model are determined. These attribute values are vector values that represent the data, such as a seismic trace. For example, the seismic trace is represented by amplitude levels at different times during the seismic trace.

The attribute vectors may be one-dimensional or multi-dimensional. For example, a seismic trace may be represented with the one-dimensional vector while a seismogram comprising multiple seismic traces is represented as a matrix that includes the vectors from multiple seismic traces. One trace can also be represented by a multidimensional vector when attributes are calculated for each sample of the trace or a group of samples in windows defined at each trace.

From operation 510, the method flows to operation 512 to identify clusters with similar noise conditions. That is, each cluster includes one or more sensors that have similar noise characteristics. The noise similarity is based on a comparison of the noise distribution for the different nodes, such as using the mean RMS amplitude (see FIG. 9), the mean dominant frequency (see FIG. 10), the mean amplitude (see FIG. 11), etc. Since the sensors in the cluster have the same noise characteristics, a filter is designed for these sensors and the filter is then used to filter out noise in the seismic data received by these sensors. More details about the calculation of clusters based on noise similarity is provided below with reference to FIGS. 6-12.

From operation 512, the method flows to operation 514 for calculating the filters used for noise attenuation on the seismic data and then applying the filters to the seismic data. One filter is calculated for each of the clusters.

The seismic trace (e.g., including two seconds, four seconds, 20 seconds) is analyzed to determine the noise characterization. There are multiple methods for designing the filters. In some example embodiments, the data captured in the time domain is converted to the frequency domain using a Fourier transform. Now the noise is characterized in amplitude and frequency. For example, with the passive noise, all the data corresponds to noise and the filter may be designed accordingly. Other types of transforms, besides the Fourier transform, may be used, such as a Stockwell transform.

There are several types of filters and the type of filter may be selected based on the noise characteristics of the cluster. In some example embodiments, an amplitude threshold is identified in the frequency spectrum of the noise. The filter is then designed to filter out frequencies with noise above the amplitude threshold. However, any method for designing the filters based on the noise characteristics may be utilized.

At operation 516, the seismic data is conditioned to account for the different data-capture times, which is referred to as time-lapse data conditioning. Since the seismic wavefield travels through the near surface which suffers changes over time, capturing data in spring or in winter will produce seismograms affected by the changing conditions of the near surface. For example, the depth of the water table might be different in spring and in winter. This effect should be removed to capture only the time-lapse changes at the level of the reservoir. Therefore, time-lapse data conditioning is performed to adjust for the different conditions at the time the signals are captured, such as by normalizing the data based on the amplitude in the parts of the seismogram outside of the reservoir.

At operation 518, a check is made to determine if $CO_2$ has been detected. If $CO_2$ is detected, the method flows to operation 520; if $CO_2$ is not detected, the method ends.

At operation 520, the locations where $CO_2$ is present is compared to the predicted locations based on numerical simulation or prior measurements.

Some of the benefits of the methods for reducing noise include: enables the use of fewer sensors on the field; the sensors do not have to be regularly distributed; evaluation of the signal and noise conditions of seismic surveys is simplified by the simple transformation of the self-organizing maps to real coordinates; the user does not require a very specialized training, the ability of applying the proposed method to sparse and irregular arrays can reduce the costs of seismic data acquisition considerably; the data processing workflows can be simplified and less time is spent in testing workflows when the method is used with high-density arrays (e.g., specific noise attenuation workflows can be designed for each cluster of sensors); and addresses the lack of reliable estimates of the spatial distribution of noise and signal in conventional data processing workflows.

In an example implementation, the ancillary data 506 included Landsat 8 data to correlate surface features derived from the satellite imagery with the main characteristics of anthropogenic noise in the study area. The Landsat data were accessed from U.S. Geological Survey (USGS) links. Images were downloaded for Path 34, Row 29, which covers southeastern Montana, northeastern Wyoming, and western South Dakota The data include eleven different bands with different wavelengths. The original Landsat data were clipped down to an area around the SASSA receiver array. The Landsat 8 data were processed to gain insights into the data and the surface features of the study area. The data were rescaled to the top of the atmosphere (TOA) reflectance and radiance. Attributes from the satellite band images were estimated to conduct automatic interpretation of the surface features.

Figure 6:
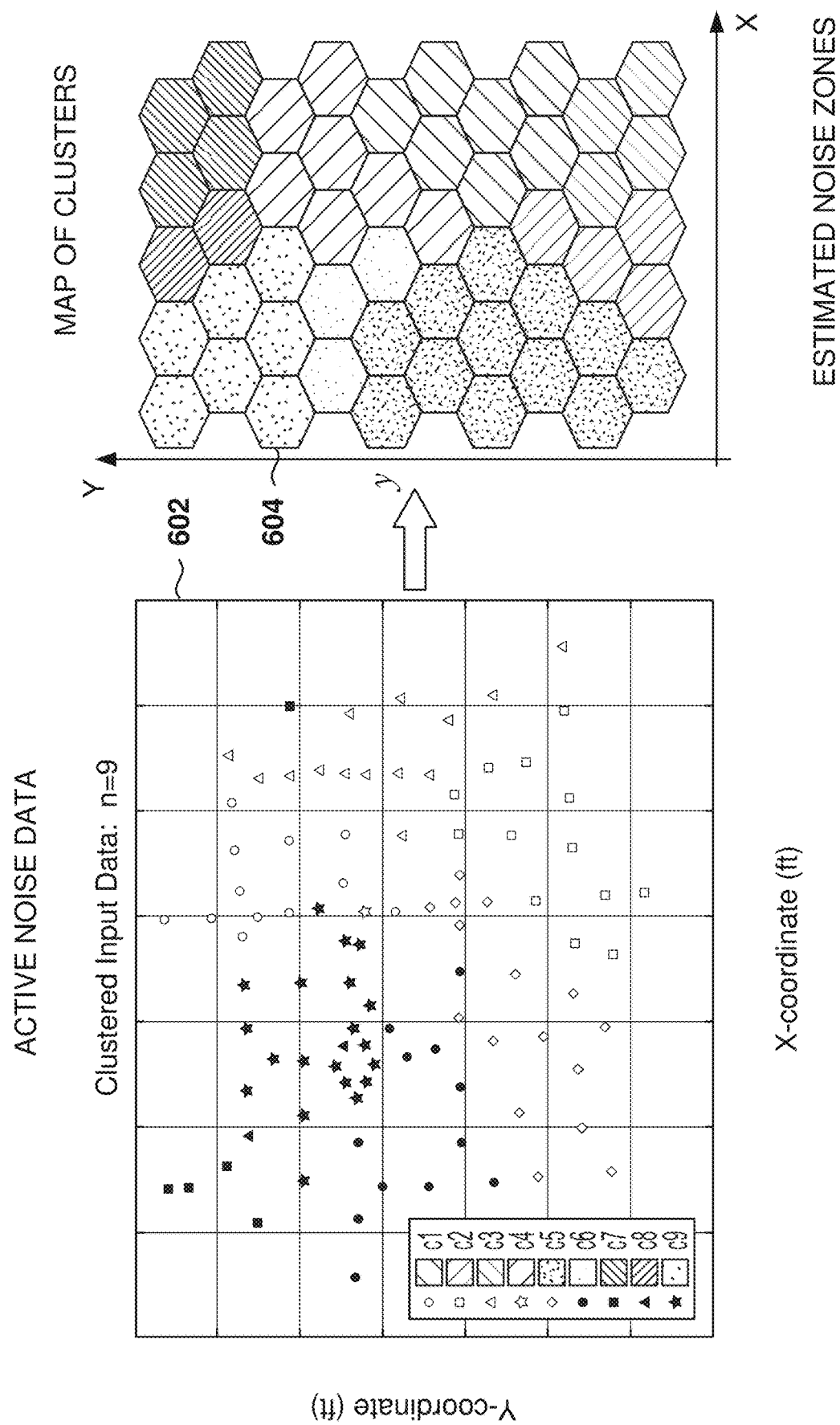
FIG. 6 shows a chart for active noise data at the sensors and the resulting mapping in clusters based on the active noise data, according to some example embodiments.

FIG. 6 shows a chart for active noise data at the sensors and the resulting mapping in clusters based on the active noise data, according to some example embodiments.

The temporal and spatial conditions of the ambient noise recorded during a SASSA survey were studied. For purposes of the present example, a hypothesis is that ambient noise is stationary during weekly data acquisition. Based on this hypothesis, passive seismic noise records (seismic data without a dedicated source) and active noise records (derived from seismic records using a seismic source) are used to estimate the noise conditions at each receiver location. Direct estimates of noise from passive and active noise records can be used to derive optimum data processing parameters to attenuate the noise included in the active seismic records.

Tests were conducted to assess the stationarity assumption of ambient noise using the machine-learning algorithm. The tests showed that the noise from active and passive records acquired on the same day provided a similar spatial distribution. However, the stationarity of ambient noise can be affected by noise transients when sensors are placed, for instance, near a road or a human-made structure (e.g., shed). While these types of transients can affect noise estimations based on active records due to their short length, the noise estimations from passive records are less affected, as they are generally longer than active records.

Based on the positive results of the noise stationary tests, both the active and the passive records can be used in the workflows presented herein. Using active noise records as input allows the application of the workflow to seismic surveys that do not record passive noise data, which is the case in most commercial seismic surveys based on cable data acquisition systems with very tight deadlines to complete data acquisition. Commercial seismic surveys using nodal systems for the acquisition can easily implement the acquisition of passive noise records since the nodes can be activated during long periods before or after data acquisition.

In one sample implementation, active and 3 component (3C) passive seismic data from a 1-year SASSA acquisition were gathered for reassessment of the noise conditions. The active seismic data were arranged in common receiver gathers for the analysis. The SASSA passive seismic data were collected before and after the active seismic acquisition. The 3C nodes used in the SASSA field study were programmed to be alive for data acquisition every week. The nodes were awake and recorded seismic information during a 14-hour window spaced in three consecutive days. During this time, the seismic source was fired up to a hundred times to create the active seismic records. The passive seismic records represent the periods during which the seismic source was not fired. Therefore, the passive seismic records were available before and after the active seismic acquisition.

Two groups of passive noise records (before and after active acquisition) for the 96 sensors were created. The raw records were converted to the SAC format to be able to read and use them in standard software packages such as MAT-LAB® and VISTA® seismic data processing.

Programs in the MATLAB® software were used to read the SAC noise records and analyze the data. A lidar image with the elevations of the SASSA sensors (FIG. 2B) was used to facilitate the analysis of active and passive noise records.

Chart 602 shows the grouping of sensors based on the noise characteristic at each sensor for active noise data. The first 200 milliseconds of the active records were used to simplify the analysis of the noncoherent noise. The active records acquired at sensors with short offsets (distance between source and receivers) required a smaller window (100 ms). Six sensors (70, 71, 75, 76, 80, and 93) very close to the seismic source had less than a 100-ms noise window. These sensors were not compared with passive noise records. In this case, passive noise records can be more useful as they can be a direct estimate of noise without extensive analysis of records containing seismic and noise.

The machine-learning program classified the sensors into noise clusters c1-c9. Other example embodiments may use a different number of clusters, such as in the range from two to 100.

Although embodiments are presented for clustering sensors into a group, other embodiments may create each sensor as one group, which means that each sensor will have its own filter for filtering out noise. In this case, the clustering operation is omitted.

The noise information was input for a machine-learning program for self-organizing maps, which created the map of clusters 604 with the estimated noise zones. The map is divided into hexagons, and each hexagon is associated with a noise category. However, other map representations besides hexagons may also be used.

One of the advantages of self-organization maps is that it is unsupervised. In some example embodiments, the results from the self-organizing maps may be further refined using other algorithms, such as K-clustering or fuzzy logic to better define the zone boundaries.

As seen on chart 602, the noise characteristics are similar for sensors in certain areas. One of the benefits of using this method is that it can reduce a multi-dimensional problem to a two-dimensional problem.

Figure 7:
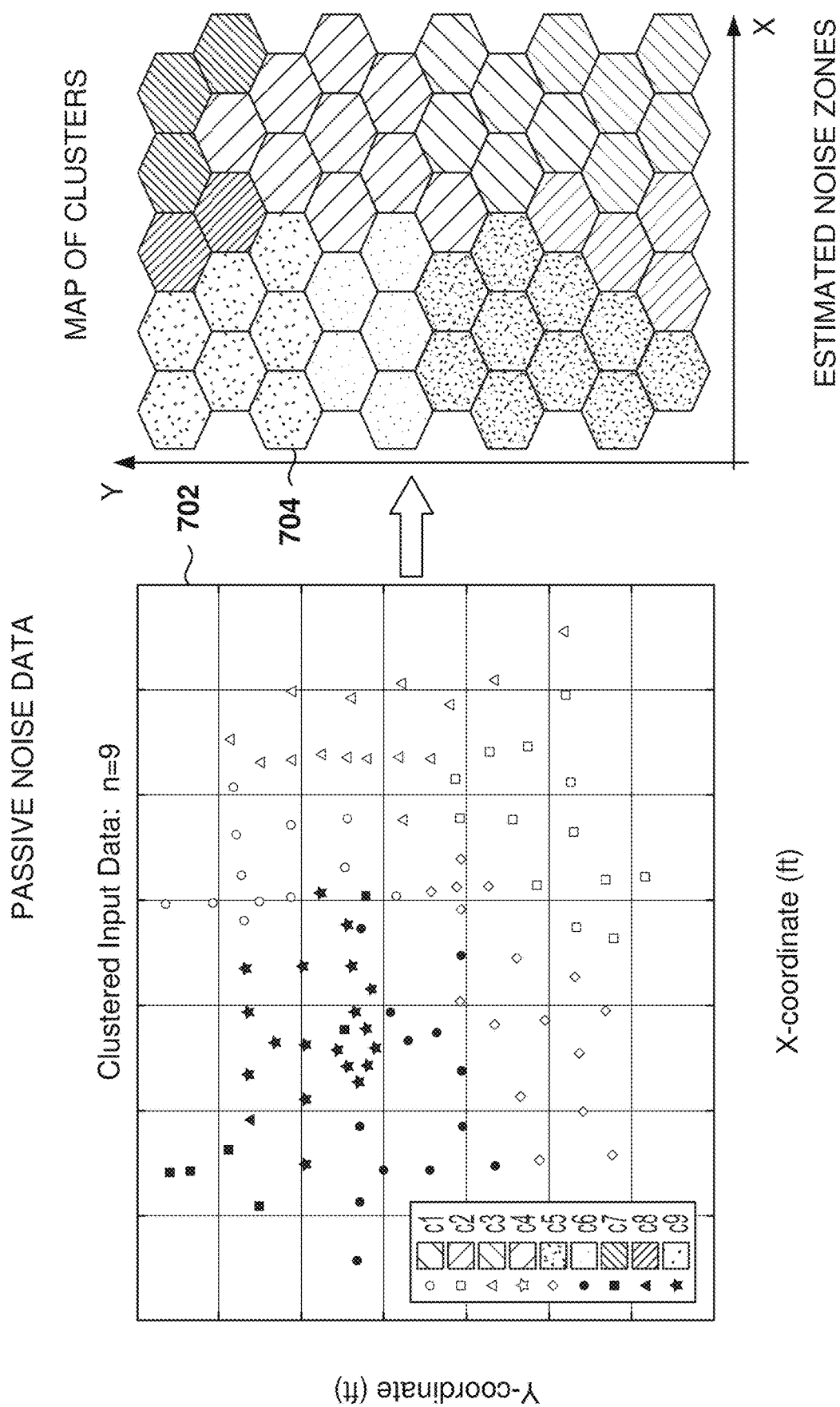
FIG. 7 shows a chart for passive noise data at the sensors and the resulting mapping in clusters based on the passive noise data, according to some example embodiments.

FIG. 7 shows a chart for passive noise data at the sensors and the resulting mapping in clusters based on the passive noise data, according to some example embodiments. In some example embodiments, the passive noise data was captured for four hours, but other time periods may be used.

Chart 702 shows the clustering of sensors into the same noise clusters c1-c9 for the passive noise data. Also, map 704 shows the corresponding clustering for the estimated noise zones using the passive noise data.

It can be readily observed by comparing the map 704 of FIG. 7 with the map 604 of FIG. 6, that the clustering of maps is very similar. This proves that using active noise data is a viable alternative to the use of passive noise data that requires longer periods of noise acquisition. This way, the clustering with active noise data is performed quickly, which is useful in many field operations. Sometimes, there is no time to acquire four hours of noise (e.g., tight deadline to deliver the seismic field data), or it is more costly (e.g., to pay for the additional use of equipment and personnel).

Figure 8:
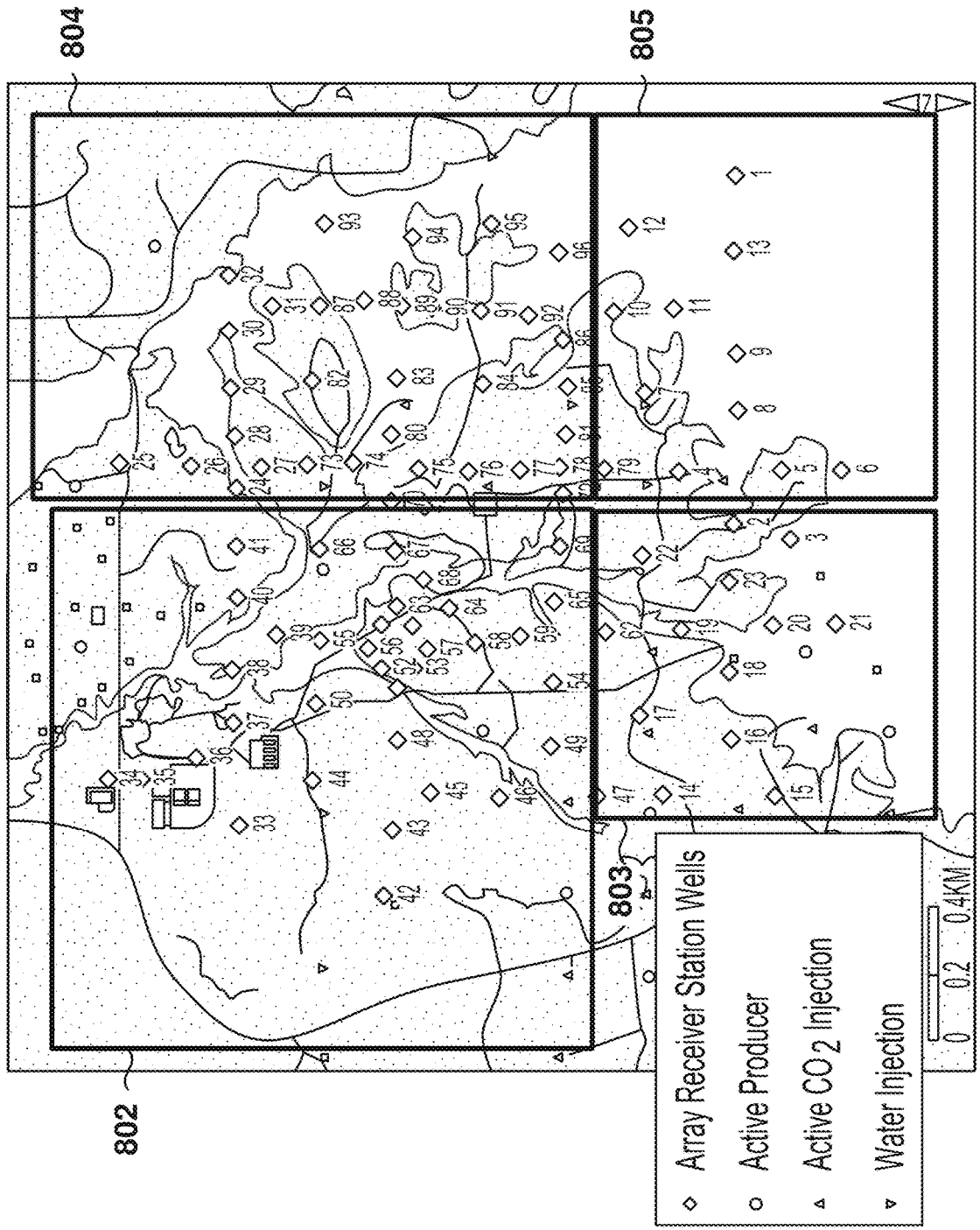
FIG. 8 is a map showing the clustering of sensors based on their noise characteristics, according to some example embodiments.

FIG. 8 is a map showing the clustering of sensors based on their noise characteristics, according to some example embodiments. At a high level, the map illustrates four different clusters 802-805, although additional clusters may be used. For example, sensors 36 (next to building) and 60 (next to power line) are included in a different cluster (not shown).

One filter is created for each of the clusters and the filter may be used for the sensors in the cluster. Since the noise characteristics of the sensors in the cluster are similar, the filter will be effective for eliminating noise in all the cluster sensors. For example, a filter eliminating a frequency of 60 Hz is used to eliminate the noise generated by the power lines.

Figure 9:
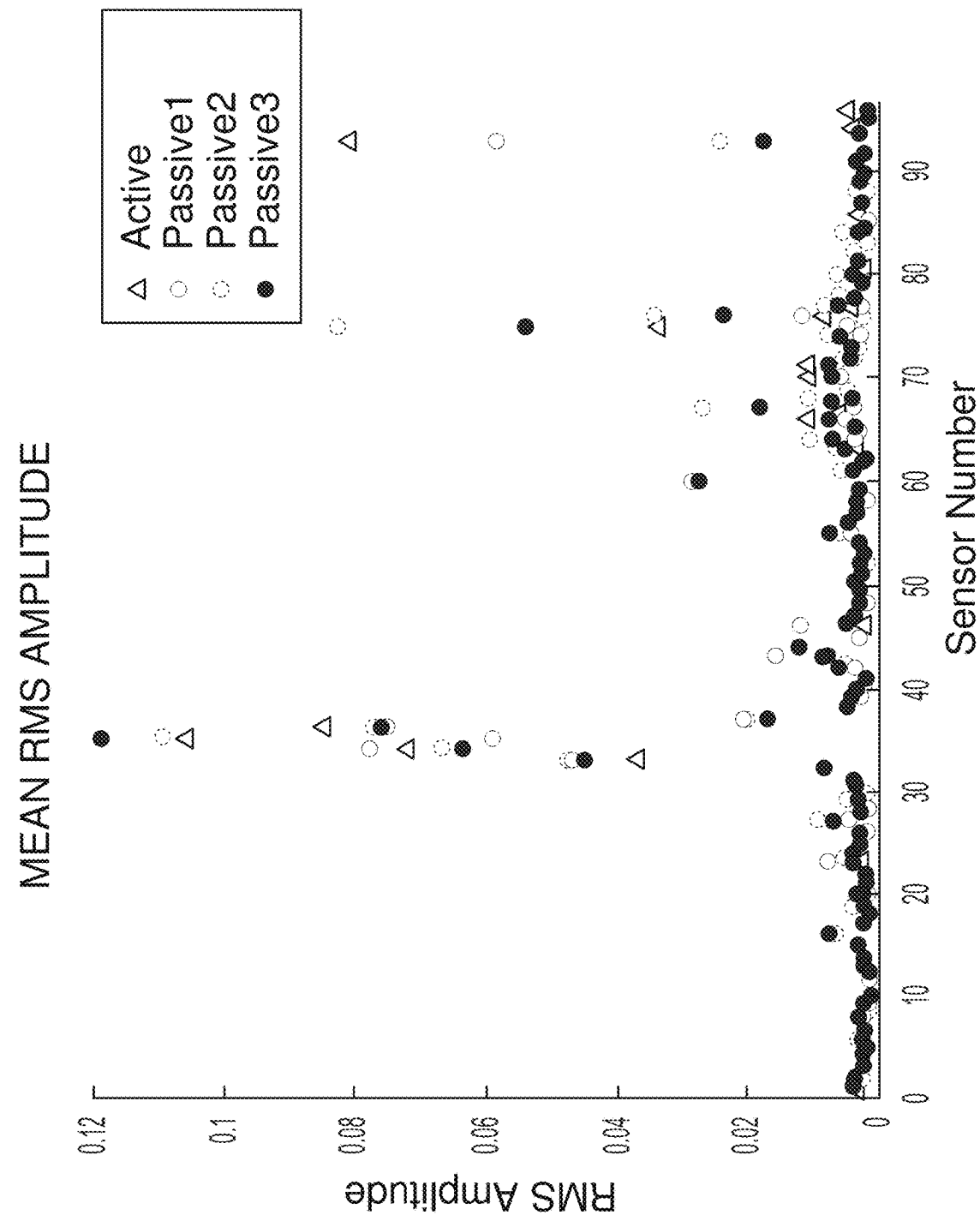
FIG. 9 is a chart showing a mean of the root mean square (RMS) amplitude of the seismic noise for the sensors, according to some example embodiments.

FIG. 9 is a chart showing a mean of the RMS (root mean square) amplitude for the sensors, according to some example embodiments. The RMS of the seismic trace amplitudes from a sensor is calculated and the number is assigned to a sensor.

Different record lengths were considered for the comparison with the 200-millisecond noise windows of the active seismic records. For the automatic estimation of noise conditions using attributes from active noise records, a window of 200 ms was used. For the estimation of passive noise records, three record lengths were used: 200 ms (passive 1), four seconds (passive 2), and 18 seconds (passive 3).

The RMS amplitude shows a few high values, but a majority of values have a low RMS amplitude, below 0.02. The sensors with high RMS amplitude represent the outliers. These nodes may be eliminated for the analysis, unless the noise filter for the node reduces the RMS amplitude.

Figure 10:
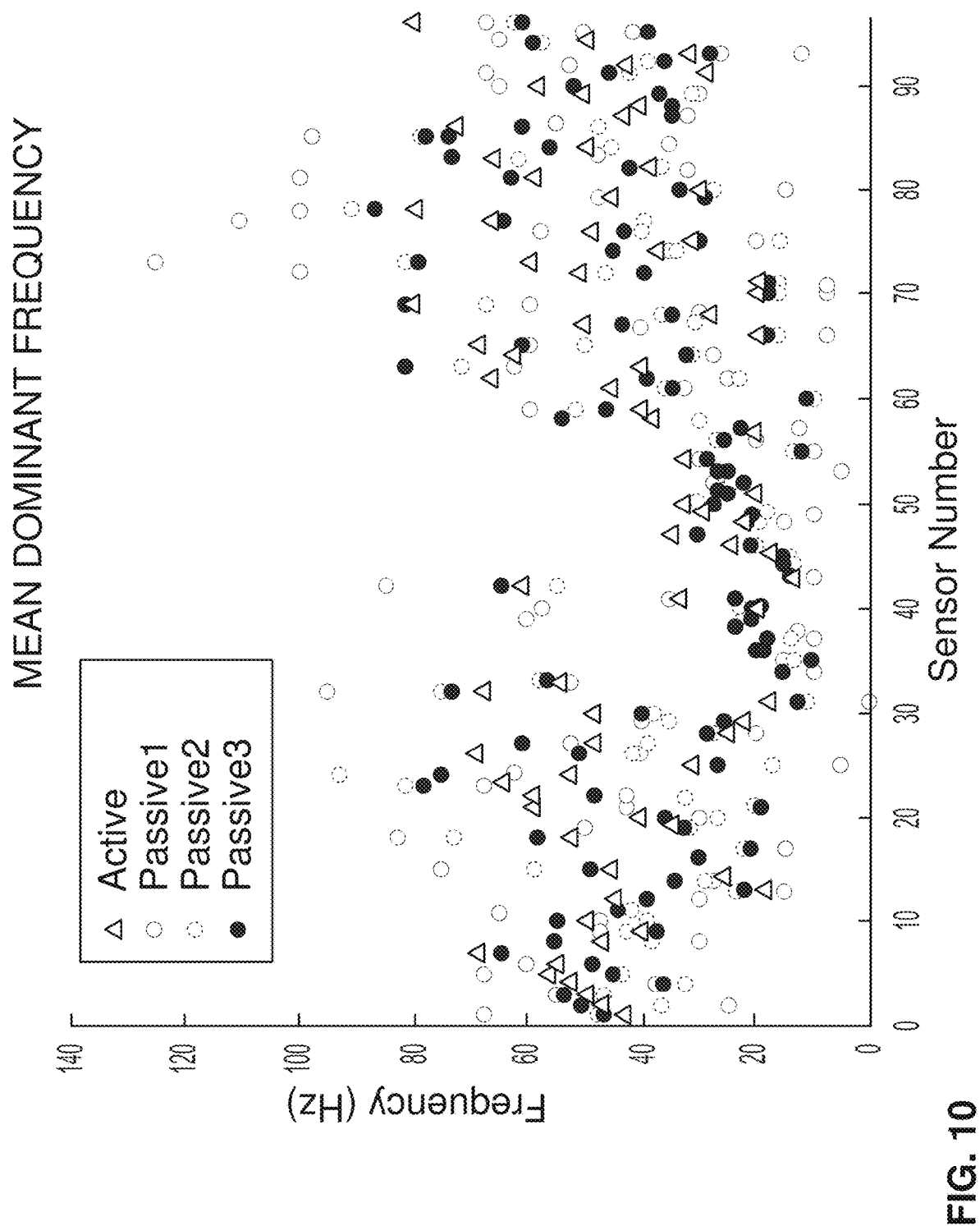
FIG. 10 is a chart showing a mean dominant frequency of the seismic noise for the sensors, according to some example embodiments.

FIG. 10 is a chart showing a mean dominant frequency of the seismic noise for the sensors, according to some example embodiments. The dominant frequency of the seismic trace of a sensor is calculated and the number is assigned to a sensor. The chart in FIG. 10 also includes values for active noise and three passive-noise measurements.

The chart shows a bigger distribution of values when compared to the chart for the RMS amplitude. This indicates that the mean dominant frequency changes over time because the environmental noise conditions may change over time.

Figure 11:
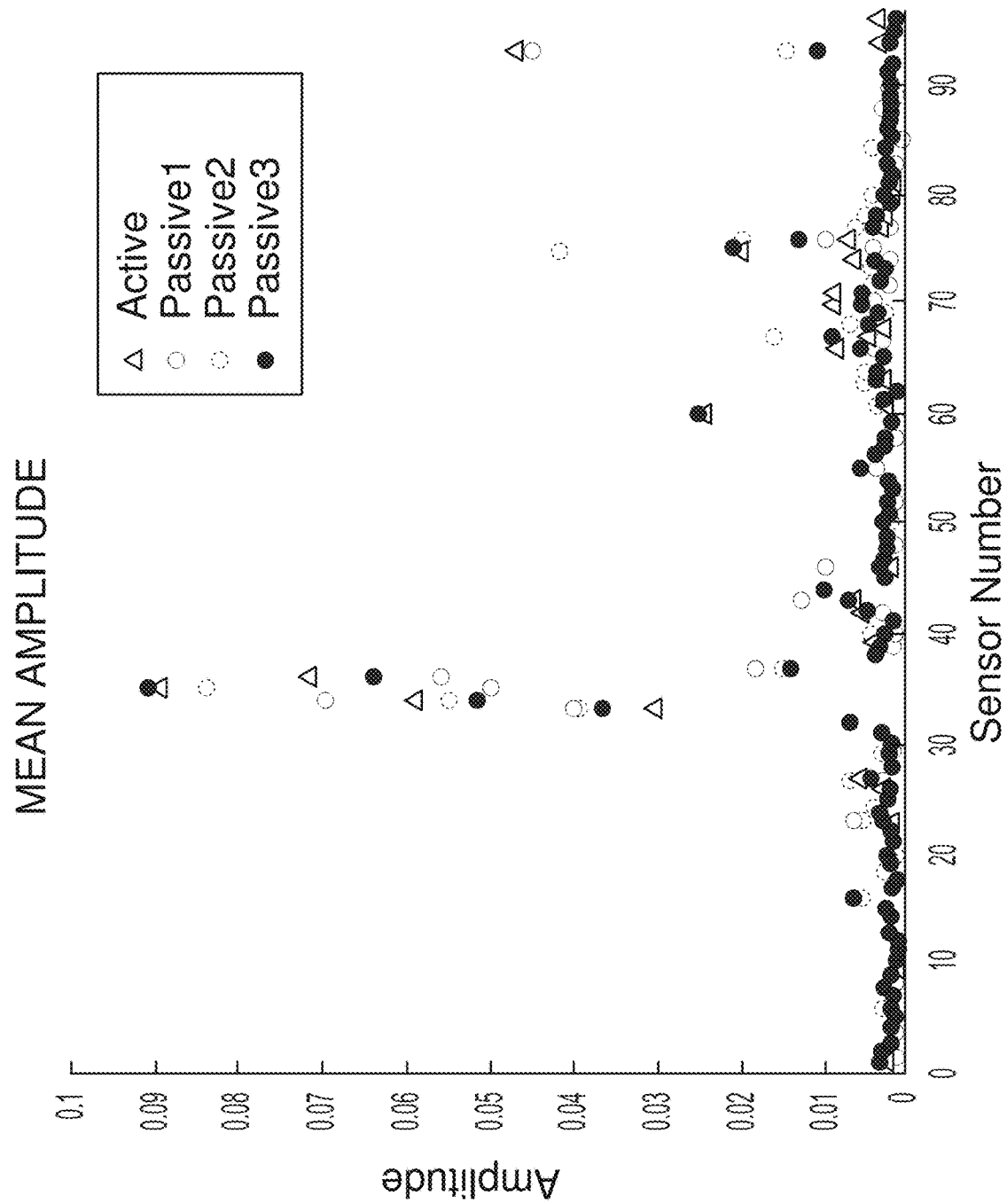
FIG. 11 is a chart showing a mean amplitude of the seismic noise for the sensors, according to some example embodiments.

FIG. 11 is a chart showing a mean amplitude of the seismic noise for the sensors, according to some example embodiments. The distribution of noise is similar to the distribution of the RMS amplitude of FIG. 9.

While the dominant frequency shows a wide distribution of frequencies without an apparent pattern, the RMS and the mean amplitude plots are dominated by a few high values. The first step of a manual procedure to derive information from these attributes for seismic data processing is to create the first group of sensors for the outliers. Noise conditions for the sensors corresponding to the outliers could be analyzed and used to derive parameters for noise attenuation algorithms. In a second step, outliers could be removed, and the resulting pattern from the distributed values could be deduced. In the case of attributes with distributions of the type shown by the dominant frequency, a manual interpretation might be more elaborate as several statistical or data processing steps may be required to understand the difference in noise conditions between sensors.

Given the complexity of analyzing the large amount of data to create filters, an automatic procedure is desirable to rapidly translate the information derived from noise records into parameters to attenuate noise in a seismic data-processing workflow. In some example embodiments, a workflow (e.g., method described in FIG. 5) is based on a machine-learning algorithm to characterize noise and attenuate the noise efficiently based on information derived from noise records (active or passive).

Figure 12:
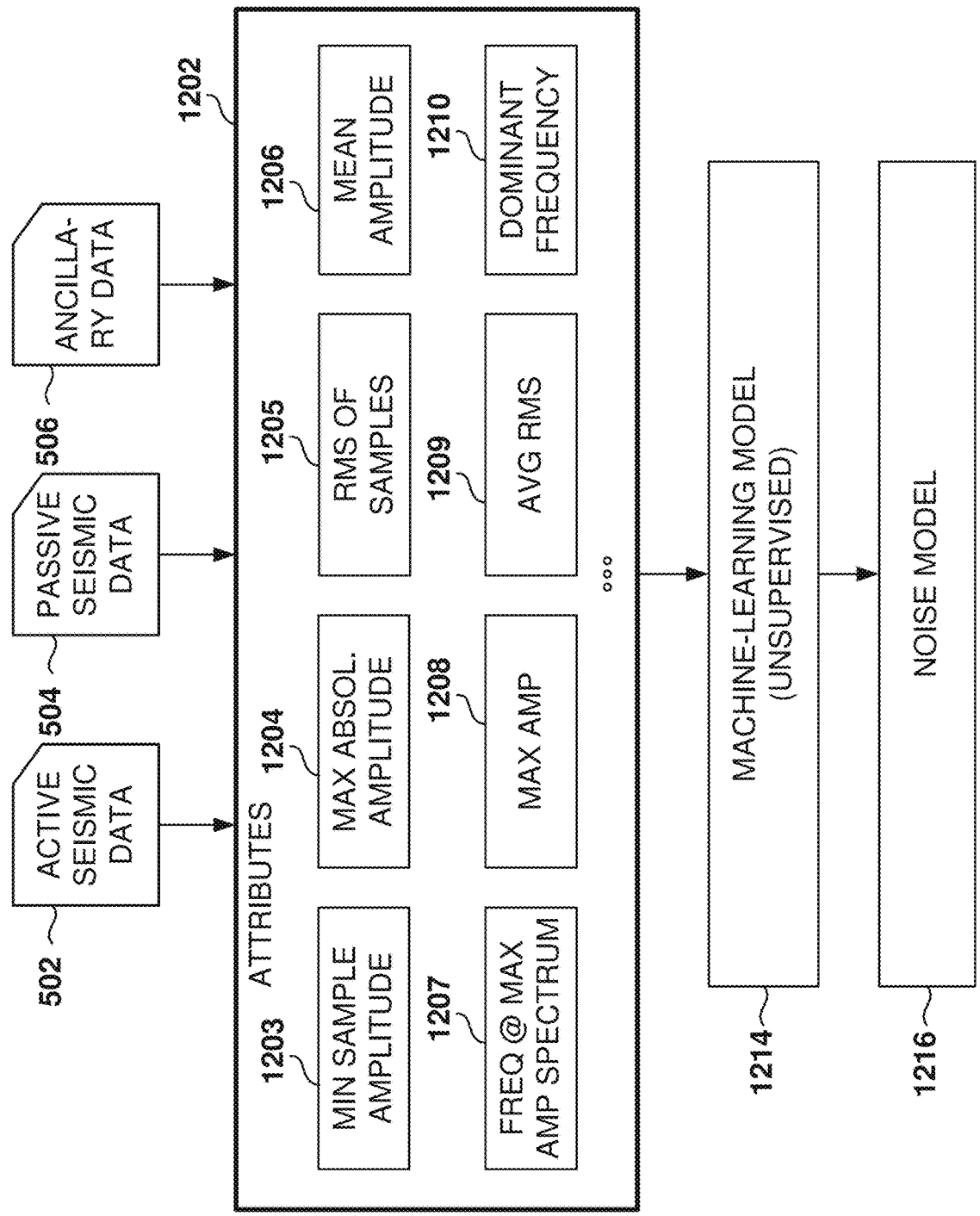
FIG. 12 illustrates the use of an unsupervised machine-learning model, according to some example embodiments.

FIG. 12 illustrates the use of an unsupervised machine-learning model, according to some example embodiments. In some example embodiments, machine-learning programs (MLPs), also referred to as machine-learning algorithms or tools, are utilized to perform operations associated with noise characterization and map determination based on noise characteristics of the sensor.

Machine learning is a field of study that gives computers the ability to learn without being explicitly programmed. Machine learning explores the study and construction of algorithms, also referred to herein as tools, that may learn from existing data and make predictions about new data.

There are two main modes for machine learning: supervised and unsupervised. Supervised learning uses prior knowledge (e.g., examples that are used for training) to learn relationships between inputs and outputs. The goal of supervised learning is to learn a function that, given some training data, best approximates the relationship between inputs and outputs. On the other hand, unsupervised learning does not have training data and the goal is to determine the structural relationship within a set of inputs.

Common tasks for unsupervised learning are clustering, representation learning, and density estimation. Some common algorithms include K-means clustering, principal component analysis, and autoencoders. Further, other use-cases for unsupervised learning are exploratory analysis and dimensionality reduction. Unsupervised learning is useful in exploratory analysis because it can automatically identify structure in data.

Dimensionality reduction refers to the methods used to represent data using less columns or attributes and can be accomplished through unsupervised methods. In representation unsupervised learning, relationships between individual attributes are learnt to allow the representation of data using the relationships in the data.

Supervised machine-learning tools operate by building a model from example training data in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used, such as Logistic Regression (LR), Naive-Bayes, Random Forest (RF), neural networks (NN), matrix factorization, and Support Vector Machines (SVM).

The unsupervised machine-learning model 1214 utilizes attributes 1202 (also referred to as features) for analyzing the data to generate the noise model 1216 (e.g., the noise characterization for each sensor). An attribute 1202 is an individual measurable property of a phenomenon being observed. The concept of an attribute is related to that of an explanatory variable used in statistical techniques such as linear regression. Choosing informative, discriminating, and independent attributes can be used for an effective operation of the machine-learning model 1214. Attributes may be of different types, such as numeric attributes, strings, and graphs.

In some example embodiments, seismic attributes were calculated from the active and passive noise records. A seismic data-processing software was used to calculate attributes from the traces included in the active and passive records. The estimated seismic attributes were stored in the headers to simplify their handling.

In some example embodiments, the attributes 1202, also referred to as attributes, may be of different types and may include one or more of minimum sample amplitude within a time period 1203, maximum absolute amplitude within a time period 1204, mean RMS amplitude value of all samples within a time period 1205, mean amplitude within a time period 1206, frequency value at the maximum of the amplitude spectrum of a time period 1207, maximum amplitude value in the amplitude spectrum taken over a time period 1208, average RMS value of the entire amplitude spectrum 1209, and mean dominant frequency 1210.

It is noted that these attributes 1202 are examples and do not describe every possible embodiment. Some embodiments may utilize a subset of these attributes or include additional attributes. The embodiments illustrated in FIG. 12 should therefore not be interpreted to be exclusive or limiting, but rather illustrative.

Therefore, the input data comprising the active seismic data 502, the passive seismic data 504, and the ancillary data 506, are used to calculate the values for the attributes 1202. The unsupervised machine-learning model 1214 that analyzes the future values and calculates the noise model 1216 for the sensors.

Satellite imagery information can also be used as another attribute by the unsupervised machine-learning model 1214 to infer information about the topographic and near-surface conditions at the sensor locations. Further, well log information from shallow wells can also be used to constrain the near-surface's geologic information of the study area and, indirectly, the noise estimations.

The unsupervised machine-learning model 1214 reduced the time and effort in the interpretation of the ambient noise conditions considerably. This improvement with regard to conventional data processing workflows facilitates the adequate parameterization of algorithms to attenuate ambient noise.

Figure 13:
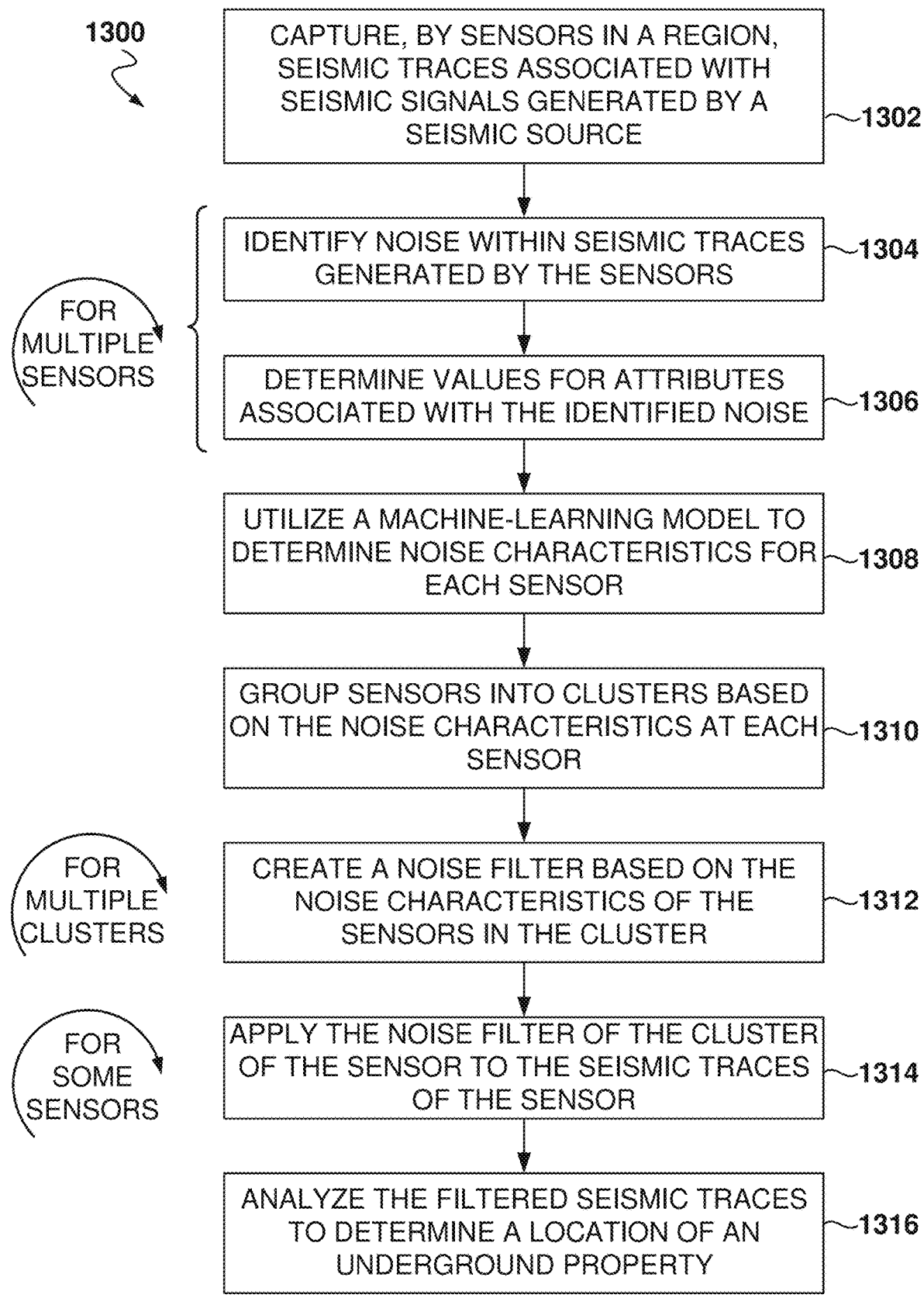
FIG. 13 is a flowchart of a method for determining the location of $CO_2$ under the surface, according to some example embodiments.

FIG. 13 is a flowchart of a method 1300 for determining the location of $CO_2$ under the surface, according to some example embodiments. While the various operations in this flowchart are presented and described sequentially, one of ordinary skill will appreciate that some or all the operations may be executed in a different order, be combined or omitted, or be executed in parallel.

Operation 1302 is for capturing, by the plurality of sensors distributed throughout a region, a plurality of seismic traces associated with seismic signals generated by a seismic source. In some example embodiments, only a subset from the sensors in the region are included in the noise analysis.

From operation 1302, the method 1300 flows to operation 1304 where noise, within seismic traces generated by the sensors, is identified for multiple sensors. The noise is selected from active noise or passive noise. Having the option of using active noise or passive noise provides more versatility to offer different types of solutions. When conventional data acquisition systems that acquire data are used, the following benefits are the result of using the embodiments presented: ability to use active noise obtained from the active records; ability to use wireless acquisition systems, where autonomous nodes are used and the normal operation of these systems is simpler than using a cable system that needs to be checked; and ability to acquire data once at a given area or return later for a time-lapse acquisition. The nodal systems allow the user to turn on the nodes at different periods, during the time when the seismic source is firing or during periods where the seismic crew is not active (e.g., at night), which facilitates the recording of passive noise records.

Permanent data-acquisition systems are designed for time-lapse acquisition (continuous monitoring of the subsurface). The benefits for permanent data-acquisition systems include ability to use different distributions of seismic sensor and receivers, such as high- or low-density of sensors, and sensors can be planted on the surface or buried to avoid noise. The sources can be buried or on the surface. When the seismic sensors are buried, the cost of the system increases, and one or several sources can be considered. Using the present embodiments, hybrid source-receiver configurations can be considered, such as sources on the surface and buried seismic sensors.

Further, the SASSA method can be utilized when the system is permanent during at least one year of acquisition, with the source and the sensors deployed on the surface. In this case, the seismic measurements are more sensitive to noise.

Further, at operation 1306, values for attributes associated with the identified noise are determined for multiple sensors.

From operation 1306, the method 1300 flows to operation 1308 where an unsupervised machine-learning model is utilized, based on the values of the attributes, to determine noise characteristics for each sensor.

From operation 1308, the method 1300 flows to operation 1310 for grouping the sensors in a plurality of clusters based on the noise characteristics for each sensor.

Further, at operation 1312, a noise filter is created, for multiple clusters, based on the noise characteristics of the sensors in the cluster. In some example embodiments, some of the cluster may be excluded from further analysis. At operation 1314 is for applying, for one or more sensors, the noise filter of the cluster of the sensor to the seismic traces of the sensor.

From operation 1314, the method 1300 flows to operation 1316 to analyze the filtered seismic traces to determine a location of an underground property.

In one example, the attributes comprise a mean root mean square (RMS) amplitude value of all samples within a time period, a mean dominant frequency, and a mean amplitude within a time period.

In one example, the attributes further comprise a minimum sample amplitude within a time period, a maximum absolute amplitude within a time period, a frequency value at the maximum of an amplitude spectrum of a time period, a maximum amplitude value in the amplitude spectrum taken over a time period, and an average RMS value of the amplitude spectrum.

In one example, the seismic trace includes reflected signal from the seismic source and a window of active noise without the reflected signal.

In one example, the passive noise is a measurement by the sensor during a period of time where no signal reflections from the seismic source are received.

In one example, the identified active noise is a measurement by the sensor during a predetermined period based on a time when the seismic signal is generated and excluding a period where a reflection of the seismic signal is captured by the sensor.

In one example, creating a noise filter further comprises converting sensor data in a time domain to a frequency domain to obtain frequency data, determining which frequencies in the frequency data have an amplitude above a predetermined threshold, and creating the noise filter to eliminate signal for the frequencies with an amplitude above the predetermined threshold.

In one example, grouping the sensors further comprises utilizing an unsupervised machine-learning model for grouping the sensors based on the noise characteristics for each sensor.

In one example, the method 1300 further comprises time-lapse data conditioning of the seismic traces to account for different data-capture times of the seismic traces.

In one example, the underground property is a location of $CO_2$ underground, the method 1300 further comprises comparing the determined location of the $CO_2$ to determine if a $CO_2$ plume has moved and presenting the determined location of the $CO_2$ on a computer display.

In one example, the noise characteristics include one or more of a root mean square (RMS) amplitude of the noise, a mean dominant frequency of the noise, and a mean amplitude of the noise.

Another general aspect is for a system that includes a seismic source for generating seismic signals, a plurality of sensors distributed throughout a region, a memory comprising instructions, one or more computer processors, and a computer display. The instructions, when executed by the one or more computer processors, cause the one or more computer processors to perform operations comprising: capturing, by the plurality of sensors, a plurality of seismic traces associated with the seismic signals generated by the seismic source; for each sensor, identifying noise within each seismic trace, the noise comprising at least one of active noise and passive noise; for each sensor, determining values for attributes associated with the identified noise; utilizing an unsupervised machine-learning model, based on the values of the attributes, to determine noise characteristics for each sensor; grouping the sensors in a plurality of clusters based on the noise characteristics for each sensor; for each cluster, creating a noise filter based on the noise characteristics of the sensors in the cluster; for one or more sensors, applying the noise filter of the cluster to the seismic traces of the sensor; analyzing the filtered seismic traces to determine a location of an underground property; and presenting the determined location of the underground property on the computer display.

In yet another general aspect, a machine-readable storage medium (e.g., a non-transitory storage medium) includes instructions that, when executed by a machine, cause the machine to perform operations comprising: capturing, by the plurality of sensors, a plurality of seismic traces associated with the seismic signals generated by the seismic source; for each sensor, identifying noise within each seismic trace, the noise comprising at least one of active noise and passive noise; for each sensor, determining values for attributes associated with the identified noise; utilizing an unsupervised machine-learning model, based on the values of the attributes, to determine noise characteristics for each sensor; grouping the sensors in a plurality of clusters based on the noise characteristics for each sensor; for each cluster, creating a noise filter based on the noise characteristics of the sensors in the cluster; for one or more sensors, applying the noise filter of the cluster to the seismic traces of the sensor; analyzing the filtered seismic traces to determine a location of an underground property; and presenting the determined location of the underground property on the computer display.

Figure 14:
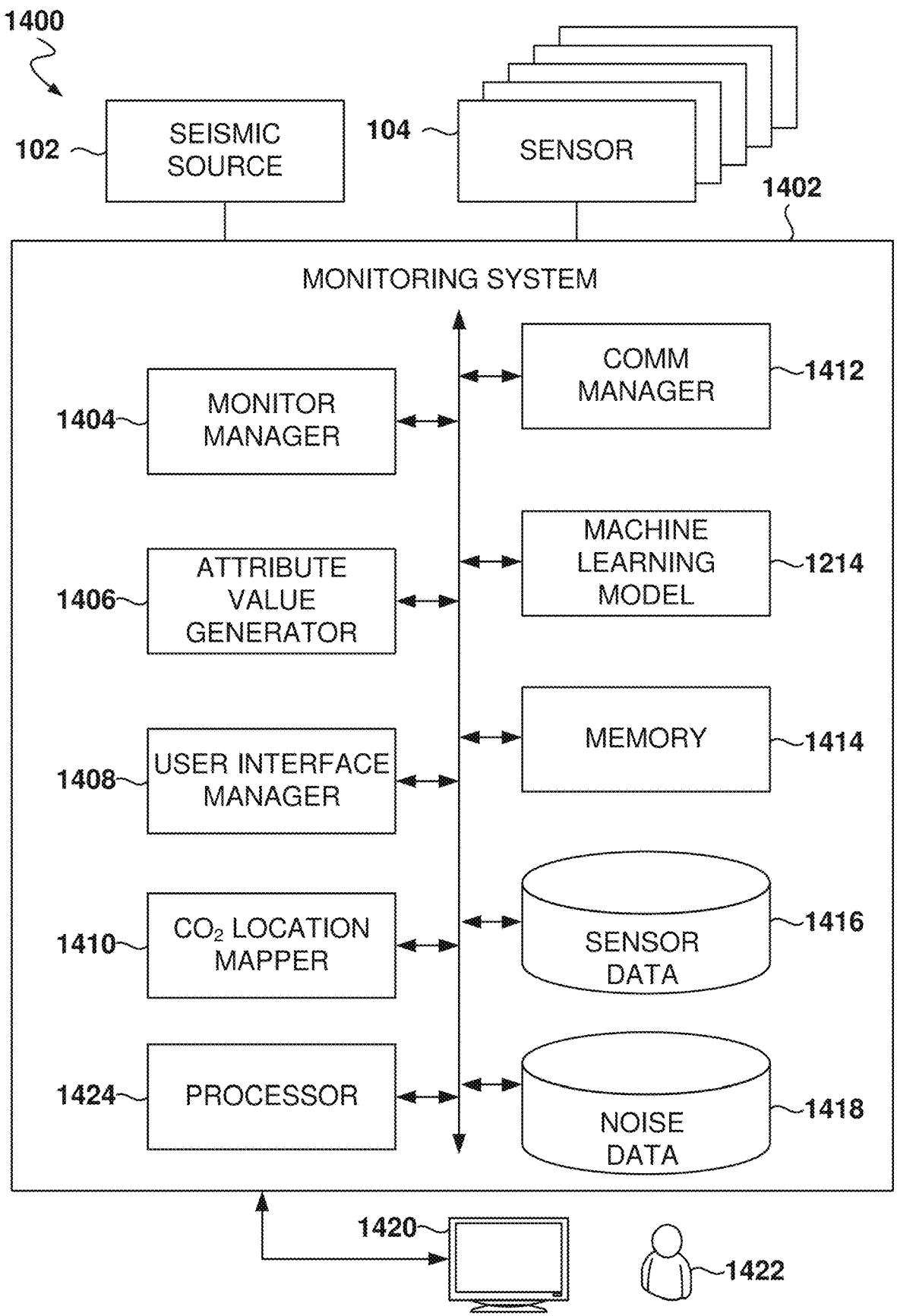
FIG. 14 illustrates a monitoring system for implementing example embodiments.

FIG. 14 illustrates a monitoring architecture 1400 for implementing example embodiments. The monitoring architecture 1400 includes the seismic source 102, a plurality of sensors 104, and a monitoring system 1402. In some example embodiments, the seismic source 102 is optional and other signal sources may be used. A user 1422 communicates, via a computer 1420, with the monitoring system 1402 to access a user interface for managing the monitoring system 1402 and viewing the results of the $CO_2$ monitorig.

In some example embodiments, the monitoring system 1402 includes a monitor manager 1404, an attribute value generator 1406, a user interface manager 1408, a $CO_2$ location mapper 1410, a communications manager 1412, one or more machine learning models 1214, a sensor data database 1416, a noise data database 1418, a memory 1414, and one or more computer processors 1424.

The monitor manager 1404 coordinates the activities of the monitoring system and the communications between the different modules. The attribute value generator 1406 is a computer program that calculates the values for the attributes, for the machine-learning model 1214, based on the noise characteristics of the sensors 104.

The user interface manager 1408 provides the user interface be displayed in the computer 1420 of the user 1422. The user interface includes options for configuring the monitoring system, accessing the data, and presenting the results to the user 1422.

The $CO_2$ location mapper 1410 determines the location of the $CO_2$ under the surface. Further, the communications manager 1412 is used for communications between the monitoring system 1402 and other devices, such as the seismic source 102, the sensors 104, the computer display 1420, other sources of data (e.g., satellite data), etc.

The sensor data database 1416 is used for storing the data for the seismic traces of the sensors 104, and the noise data database 1418 is used for storing noise data, such as the noise characteristics for the sensors.

It is noted that the embodiments illustrated in FIG. 14 are examples and do not describe every possible embodiment. Other embodiments may utilize additional modules, fewer modules, or combine the functionality of two or more modules into a single module. The embodiments illustrated in FIG. 14 should therefore not be interpreted to be exclusive or limiting, but rather illustrative.

Figure 15:
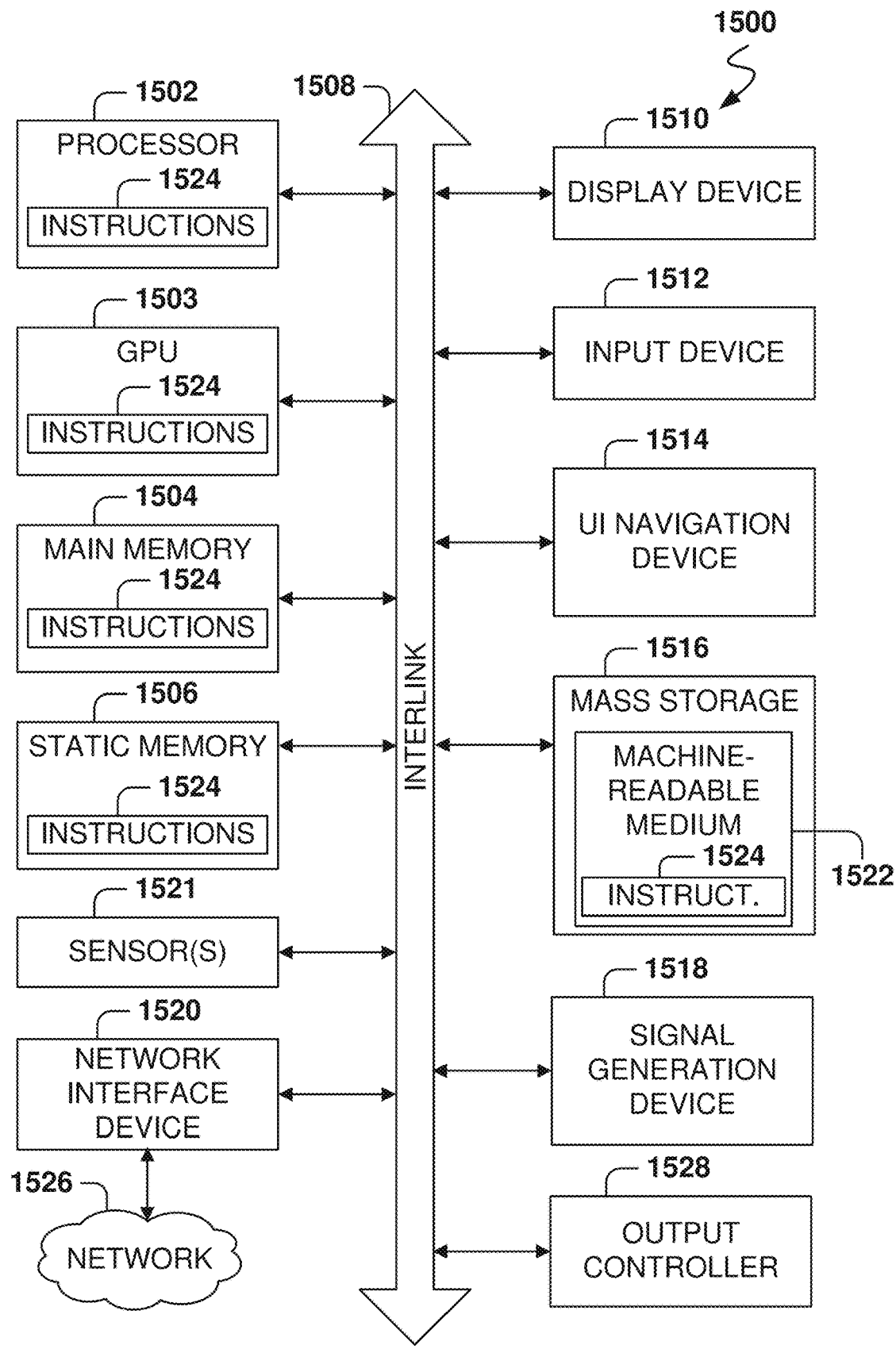
FIG. 15 is a block diagram illustrating an example of a machine upon or by which one or more example process embodiments described herein may be implemented or controlled.

FIG. 15 is a block diagram illustrating an example of a machine 1500 upon or by which one or more example process embodiments described herein may be implemented or controlled. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in a peer-to-peer (P2P) (or other distributed) network environment. Further, while only a single machine 1500 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1500 may include a hardware processor 1502 (e.g., a central processing unit (CPU), a hardware processor core, or any combination thereof), a graphics processing unit (GPU) 1503, a main memory 1504, and a static memory 1506, some or all of which may communicate with each other via an interlink (e.g., bus) 1508. The machine 1500 may further include a display device 1510, an alphanumeric input device 1512 (e.g., a keyboard), and a user interface (UI) navigation device 1514 (e.g., a mouse). In an example, the display device 1510, alphanumeric input device 1512, and UI navigation device 1514 may be a touch screen display. The machine 1500 may additionally include a mass storage device (e.g., drive unit) 1516, a signal generation device 1518 (e.g., a speaker), a network interface device 1520, and one or more sensors 1521, such as a Global Positioning System (GPS) sensor, compass, accelerometer, or another sensor. The machine 1500 may include an output controller 1528, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1516 may include a machine-readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within the static memory 1506, within the hardware processor 1502, or within the GPU 1503 during execution thereof by the machine 1500. In an example, one or any combination of the hardware processor 1502, the GPU 1503, the main memory 1504, the static memory 1506, or the mass storage device 1516 may constitute machine-readable media.

While the machine-readable medium 1522 is illustrated as a single medium, the term "machine-readable medium" may include a single medium, or multiple media, (e.g., a centralized or distributed database, and/or associated caches and servers) configured to store the one or more instructions 1524.

The term "machine-readable medium" may include any medium that is capable of storing, encoding, or carrying instructions 1524 for execution by the machine 1500 and that cause the machine 1500 to perform any one or more of the techniques of the present disclosure, or that is capable of storing, encoding, or carrying data structures used by or associated with such instructions 1524. Non-limiting machine-readable medium examples may include solid-state memories, and optical and magnetic media. In an example, a massed machine-readable medium comprises a machine-readable medium 1522 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device 1520.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   capturing, by a plurality of sensors distributed throughout a region, a plurality of seismic traces associated with seismic signals generated by a seismic source;
   for multiple sensors, identifying noise within seismic traces generated by the sensors, the noise comprising at least one of active noise and passive noise;
   for multiple sensors, determining values for attributes associated with the identified noise;
   utilizing an unsupervised machine-learning model, based on the values of the attributes, to determine noise characteristics for each sensor;
   grouping the sensors in a plurality of clusters based on the noise characteristics for each sensor;
   for multiple clusters, creating a noise filter based on the noise characteristics of the sensors in the cluster;
   for one or more sensors, applying the noise filter of the cluster of the sensor to the seismic traces of the sensor; and
   analyzing the filtered seismic traces to determine an underground property.

2. The method as recited in claim 1, wherein the attributes comprise a mean root mean square (RMS) amplitude value of all samples within a time period, a mean dominant frequency, and a mean amplitude within a time period.

3. The method as recited in claim 2, wherein the attributes further comprise a minimum sample amplitude within a time period, a maximum absolute amplitude within a time period, a frequency value at the maximum of an amplitude spectrum of a time period, a maximum amplitude value in the amplitude spectrum taken over a time period, and an average RMS value of the amplitude spectrum.

4. The method as recited in claim 1, wherein the seismic trace includes a reflected signal from the seismic source and a window of active noise without the reflected signal.

5. The method as recited in claim 1, wherein the identified passive noise is a measurement by the sensor during a period of time where no signal reflections from the seismic source are received and excluding a period where a reflection of the seismic signal is captured by the sensor.

6. The method as recited in claim 1, wherein the identified active noise is a measurement by the sensors during a predetermined period based on a time when the seismic signal is generated.

7. The method as recited in claim 1, wherein creating a noise filter further comprises:

converting sensor data in a time domain to a frequency domain to obtain frequency data;

determining which frequencies in the frequency data have an amplitude above a predetermined threshold; and creating the noise filter to eliminate signal for the frequencies with an amplitude above the predetermined threshold.

8. The method as recited in claim 1, wherein grouping the sensors further comprises:

utilizing an unsupervised machine-learning model for grouping the sensors based on the noise characteristics for each sensor.

9. The method as recited in claim 1, further comprising:

time-lapse data conditioning of the seismic traces to account for different data-capture times of the seismic traces.

10. The method as recited in claim 1, wherein the underground property is a location of $CO_2$ underground, the method further comprising:

comparing the determined location of the $CO_2$ to determine if a $CO_2$ plume has moved; and presenting the determined location of the $CO_2$ on a computer display.

11. The method as recited in claim 1, wherein the noise characteristics include one or more of a root mean square (RMS) amplitude of the noise, a mean dominant frequency of the noise, and a mean amplitude of the noise.

12. A system comprising:

a seismic source for generating seismic signals;

a plurality of sensors distributed throughout a region;

a memory comprising instructions;

one or more computer processors; and a computer display, wherein the instructions, when executed by the one or more computer processors, cause the system to perform operations comprising:

capturing, by the plurality of sensors, a plurality of seismic traces associated with the seismic signals generated by the seismic source;

for multiple sensors, identifying noise within seismic traces generated by the sensors, the noise comprising at least one of active noise and passive noise;

for multiple sensors, determining values for attributes associated with the identified noise;

utilizing an unsupervised machine-learning model, based on the values of the attributes, to determine noise characteristics for each sensor;

grouping the sensors in a plurality of clusters based on the noise characteristics for each sensor;

for multiple clusters, creating a noise filter based on the noise characteristics of the sensors in the cluster;

for one or more sensors, applying the noise filter of the cluster of the sensor to the seismic traces of the sensor;

analyzing the filtered seismic traces to determine a location of an underground property; and presenting the determined location of the underground property on the computer display.

13. The system as recited in claim 12, wherein the attributes comprise a mean root mean square (RMS) amplitude value of all samples within a time period, a mean dominant frequency, and a mean amplitude within a time period.

14. The system as recited in claim 13, wherein the attributes further comprise a minimum sample amplitude within a time period, a maximum absolute amplitude within a time period, a frequency value at the maximum of an amplitude spectrum of a time period, a maximum amplitude value in the amplitude spectrum taken over a time period, and an average RMS value of the amplitude spectrum.

15. The system as recited in claim 12, wherein the seismic trace includes reflected signal from the seismic source and a window of active noise without the reflected signal.

16. The system as recited in claim 12, wherein the identified passive noise is a measurement by the sensor during a period of time where no signal reflections from the seismic source are received and excluding a period where a reflection of the seismic signal is captured by the sensor.

17. A non-transitory machine-readable storage medium including instructions that, when executed by a machine, cause the machine to perform operations comprising:

capturing, by a plurality of sensors distributed throughout a region, a plurality of seismic traces associated with seismic signals generated by a seismic source;

for multiple sensors, identifying noise within seismic traces generated by the sensors, the noise comprising at least one of active noise and passive noise;

for multiple sensors, determining values for attributes associated with the identified noise;

utilizing an unsupervised machine-learning model, based on the values of the attributes, to determine noise characteristics for each sensor;

grouping the sensors in a plurality of clusters based on the noise characteristics for each sensor;

for multiple clusters, creating a noise filter based on the noise characteristics of the sensors in the cluster;

for one or more sensors, applying the noise filter of the cluster of the sensor to the seismic traces of the sensor; and analyzing the filtered seismic traces to determine a location of an underground property.

18. The non-transitory machine-readable storage medium as recited in claim 17, wherein the attributes comprise a mean root mean square (RMS) amplitude value of all samples within a time period, a mean dominant frequency, and a mean amplitude within a time period.

19. The non-transitory machine-readable storage medium as recited in claim 18, wherein the attributes further comprise a minimum sample amplitude within a time period, a maximum absolute amplitude within a time period, a frequency value at the maximum of an amplitude spectrum of a time period, a maximum amplitude value in the amplitude spectrum taken over a time period, and an average RMS value of the amplitude spectrum.

20. The non-transitory machine-readable storage medium as recited in claim 17, wherein the seismic trace includes reflected signal from the seismic source and a window of active noise without the reflected signal.

21. The non-transitory machine-readable storage medium as recited in claim 17, wherein the identified passive noise is a measurement by the sensor during a period of time where no signal reflections from the seismic source are received and excluding a period where a reflection of the seismic signal is captured by the sensor.

* * * * *